United States Patent
Harel

(10) Patent No.: US 10,291,298 B2
(45) Date of Patent: May 14, 2019

(54) REMOTE UNIT SUPPORTING RADIO FREQUENCY (RF) SPECTRUM-BASED COVERAGE AREA OPTIMIZATION IN A WIRELESS DISTRIBUTION SYSTEM (WDS)

(71) Applicant: Corning Optical Communications LLC, Hickory, NC (US)

(72) Inventor: Dror Harel, Hod Hasharon (IL)

(73) Assignee: Corning Optical Communications LLC, Hickory, NC (US)

( * ) Notice: Subject to any disclaimer, the term of this patent is extended or adjusted under 35 U.S.C. 154(b) by 13 days.

(21) Appl. No.: 15/490,049

(22) Filed: Apr. 18, 2017

(65) Prior Publication Data

US 2018/0302126 A1    Oct. 18, 2018

(51) Int. Cl.
   *H04W 4/00* (2018.01)
   *H04B 7/0408* (2017.01)
   (Continued)

(52) U.S. Cl.
   CPC .......... *H04B 7/0408* (2013.01); *H04W 16/02* (2013.01); *H04W 16/28* (2013.01);
   (Continued)

(58) Field of Classification Search
   CPC combination set(s) only.
   See application file for complete search history.

(56) References Cited

U.S. PATENT DOCUMENTS 5,852,651 A    12/1998 Fischer et al.
6,353,600 B1    3/2002 Schwartz et al.
(Continued)

FOREIGN PATENT DOCUMENTS

WO    2017051352 A1    3/2017

OTHER PUBLICATIONS

David Wake et al: Design and performance of radio over fiber links for next generation wireless systems using distributed antennas*, 2810 Future Network & Mobile Summit Jun. 16-18, IEEE, IEEE Piscataway, JJ, USA,Jun. 16 2G1G (Jun. 16, 2016), pp. 1-9, XP031921936,ISBN: 978-1-905824-16-8.*

(Continued)

*Primary Examiner* — Chi H Pham
*Assistant Examiner* — Fahmida S Chowdhury
(74) *Attorney, Agent, or Firm* — C. Keith Montgomery

(57) ABSTRACT

Embodiments of the disclosure relate to a remote unit supporting radio frequency (RF) spectrum-based coverage area optimization in a wireless distribution system (WDS). A remote unit in a WDS includes a plurality of sector RF paths configured to support sectored coverage areas around the remote unit. Each of the sector RF paths includes an antenna configured to communicate an RF communications signal(s) in an RF spectrum(s). A processing circuit determines a selected downlink sector communications signal(s) to be distributed at a selected power from a selected sector RF path(s) in a selected RF spectrum(s) and provides the selected downlink sector communications signal(s) to the selected sector RF path(s). In this manner, the processing circuit can independently configure a sector RF path(s) to distribute a downlink RF communications signal(s) in an RF spectrum(s) at a desired power(s), thus enabling directional capacity optimization and/or RF interference mitigation around the remote unit.

62 Claims, 13 Drawing Sheets

(51) Int. Cl.
   *H04W 16/28* (2009.01)
   *H04W 52/42* (2009.01)
   *H04W 52/14* (2009.01)
   *H04W 88/08* (2009.01)
   *H04W 16/02* (2009.01)

(52) U.S. Cl.
   CPC ......... *H04W 52/143* (2013.01); *H04W 52/42* (2013.01); *H04W 88/085* (2013.01)

(56) References Cited

U.S. PATENT DOCUMENTS

| | | | |
|---|---|---|---|
| 7,062,246 | B2 | 6/2006 | Owen |
| 7,065,384 | B2 | 6/2006 | Izadpanah |
| 7,299,071 | B1 | 11/2007 | Barratt et al. |
| 7,319,888 | B2 | 1/2008 | Li et al. |
| 7,358,922 | B2 | 4/2008 | Le et al. |
| 7,596,387 | B2 | 9/2009 | Goldberg et al. |
| 8,504,109 | B2 | 8/2013 | McGowan et al. |
| 8,913,892 | B2 | 12/2014 | Berlin et al. |
| 8,989,817 | B2 | 3/2015 | Wu et al. |
| 2006/0007890 | A1 | 1/2006 | Yokoyama |
| 2008/0291856 | A1 | 11/2008 | Li et al. |
| 2008/0297413 | A1 | 12/2008 | Kokku et al. |
| 2009/0280853 | A1* | 11/2009 | Brisebois ............ H04W 52/143 455/522 |
| 2011/0244914 | A1 | 10/2011 | Venkatraman et al. |
| 2011/0268449 | A1 | 11/2011 | Berlin et al. |
| 2012/0057572 | A1* | 3/2012 | Evans ................. H04W 88/085 370/338 |
| 2013/0236180 | A1* | 9/2013 | Kim .................... H04J 14/0236 398/72 |
| 2015/0215874 | A1* | 7/2015 | Chen .................... H04W 52/18 455/522 |
| 2016/0073313 | A1 | 3/2016 | Hejazi et al. |
| 2018/0279316 | A1* | 9/2018 | Mueck ................ H04B 17/345 |

OTHER PUBLICATIONS

U.S. Appl. No. 15/920,789 titled "Remote Antenna Unit (RAU) With Multiple Antenna Assembly in a Distributed Antenna System (DAS)", filed Mar. 14, 2018. 44 pgs.

International Search Report and Written Opinion PCT/IL2018/050421 dated Jun. 28, 2018.

Wake et al. "Design and performance of radio over fibre links for next generation wireless systems using distributed antennas", 2010 IEEE Future Network & Mobile Summit, pp. 1-9.

* cited by examiner

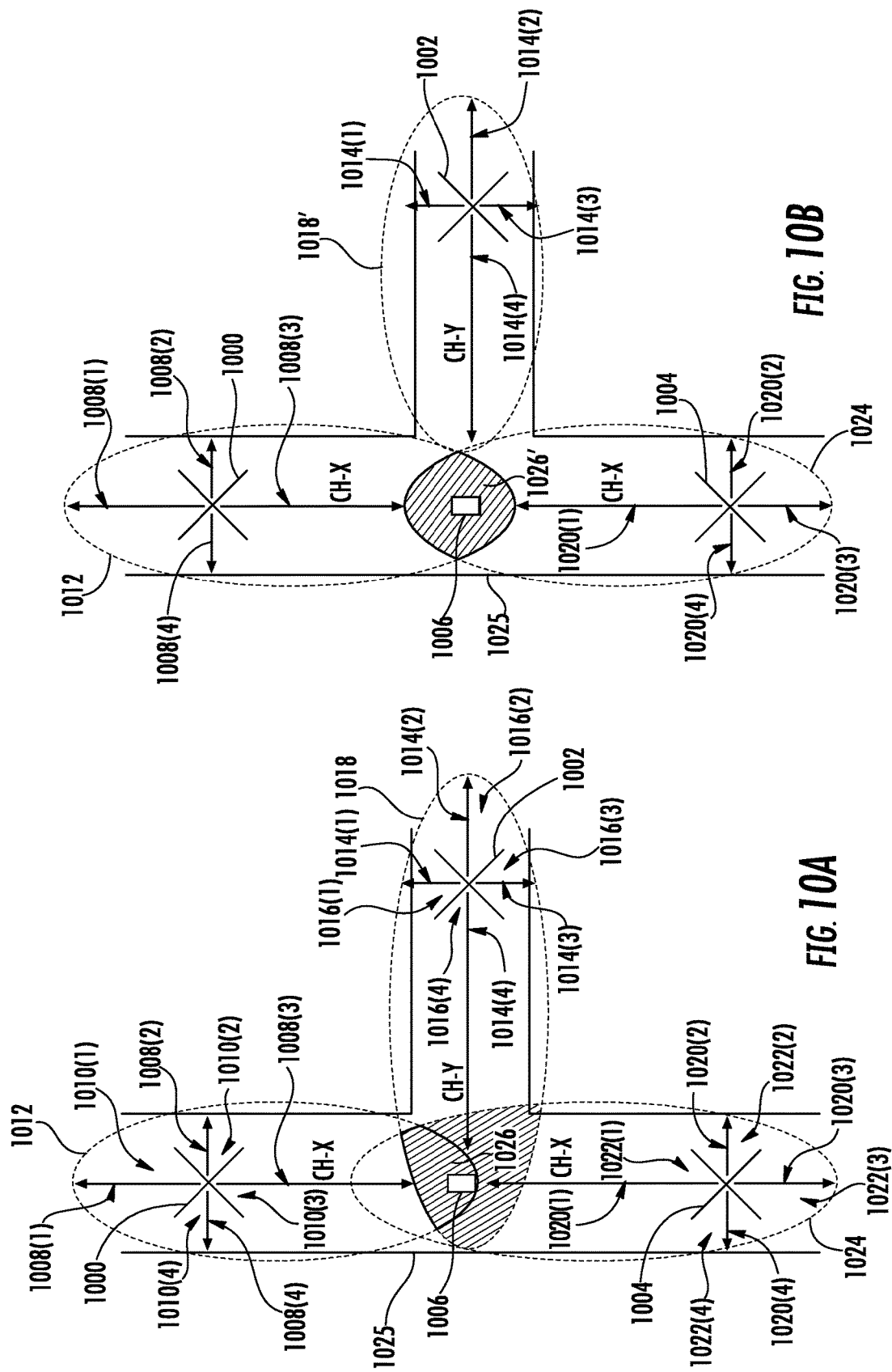

US 10,291,298 B2

REMOTE UNIT SUPPORTING RADIO FREQUENCY (RF) SPECTRUM-BASED COVERAGE AREA OPTIMIZATION IN A WIRELESS DISTRIBUTION SYSTEM (WDS)

BACKGROUND

The disclosure relates generally to a wireless distribution system (WDS) and more particularly to techniques for optimizing radio frequency (RF) coverage in a WDS.

Wireless customers are increasingly demanding digital data services, such as streaming video signals. At the same time, some wireless customers use their wireless communications devices in areas that are poorly serviced by conventional cellular networks, such as inside certain buildings or areas where there is little cellular coverage. One response to the intersection of these two concerns has been the use of WDSs. WDSs include remote units configured to receive and transmit communications signals to client devices within the antenna range of the remote units. WDSs can be particularly useful when deployed inside buildings or other indoor environments where the wireless communications devices may not otherwise be able to effectively receive RF signals from a signal source.

In this regard, FIG. 1 illustrates distribution of communication services to remote coverage areas 100(1)-100(N) of a WDS 102 provided in the form of a DAS, wherein 'N' is the number of remote coverage areas. These communication services can include cellular services, wireless services, such as radio frequency identification (RFID) tracking, Wireless Fidelity (Wi-Fi), local area network (LAN), wireless LAN (WLAN), wireless solutions (Bluetooth, Wi-Fi Global Positioning System (GPS) signal-based, and others) for location-based services, and combinations thereof, as examples. The remote coverage areas 100(1)-100(N) may be remotely located. In this regard, the remote coverage areas 100(1)-100(N) are created by and centered on remote units 104(1)-104(N) connected to a central unit 106 (e.g., a head-end controller, a head-end unit (HEU), or a head-end equipment (HEE)). The central 106 may be communicatively coupled to a signal source 108, for example, a base transceiver station (BTS) or a baseband unit (BBU). In this regard, the central unit 106 receives downlink communications signals 110D from the signal source 108 to be distributed to the remote units 104(1)-104(N). The remote units 104(1)-104(N) are configured to receive the downlink communications signals 110D from the HEE 106 over a communications medium 112 to be distributed to the respective remote coverage areas 100(1)-100(N) of the remote units 104(1)-104(N). In a non-limiting example, the communications medium 112 may be a wired communications medium, a wireless communications medium, or an optical fiber-based communications medium. Each of the remote units 104(1)-104(N) may include an RF transmitter/receiver and a respective antenna 114(1)-114(N) operably connected to the RF transmitter/receiver to wirelessly distribute the communication services to client devices 116 within the respective remote coverage areas 100(1)-100(N). The remote units 104(1)-104(N) are also configured to receive uplink communications signals 110U from the client devices 116 in the respective remote coverage areas 100(1)-100(N) to be distributed to the signal source 108. The size of each of the remote coverage areas 100(1)-100(N) is determined by the amount of RF power transmitted by the respective remote units 104(1)-104(N), receiver sensitivity, antenna gain, and RF environment, as well as by RF transmitter/receiver sensitivity of the client devices 116. The client devices 116 usually have a fixed maximum RF receiver sensitivity, so that the above-mentioned properties of the remote units 104(1)-104(N) mainly determine the size of the respective remote coverage areas 100(1)-100(N).

Each of the remote units 104(1)-104(N) may include multiple sector antennas for distributing the downlink communications signals 110D in multiple radiation directions and radiation patterns. The downlink communications signals 110D may occupy a plurality of RF spectrums (e.g., bands or channels). In this regard, it may be desired to shape radiation patterns of the multiple sector antennas to help provide directional capacity optimization and/or mitigate RF interference in an indoor environment.

No admission is made that any reference cited herein constitutes prior art. Applicant expressly reserves the right to challenge the accuracy and pertinency of any cited documents.

SUMMARY

Embodiments of the disclosure relate to a remote unit supporting radio frequency (RF) spectrum-based coverage area optimization in a wireless distribution system (WDS). A remote unit in a WDS includes a plurality of sector RF paths configured to support sectored coverage areas around the remote unit. Each of the sector RF paths includes an antenna configured to communicate an RF communications signal(s) in an RF spectrum(s) (e.g., band or channel). A processing circuit in the remote unit is configured to support RF spectrum-based coverage optimization in the sectored coverage areas. In one aspect, the processing circuit determines a selected downlink sector communications signal(s) to be distributed at a selected power from a selected sector RF path(s) in a selected RF spectrum(s) and provides the selected downlink sector communications signal(s) to the selected sector RF path(s) for distribution in a respective sectored coverage area. In this manner, the processing circuit can independently configure a sector RF path(s) to distribute a downlink RF communications signal(s) in an RF spectrum(s) at a desired power(s), thus enabling directional capacity optimization and/or RF interference mitigation around the remote unit.

In one embodiment, a remote unit in a WDS is provided. The remote unit includes a plurality of sector RF paths each comprising an antenna configured to distribute a respective downlink sector communications signal. The remote unit also includes a processing circuit. The processing circuit is configured to receive at least one downlink communications stream corresponding to at least one downlink spectrum chunk comprising a plurality of downlink spectrums. The processing circuit is also configured to generate a plurality of downlink sector communications signals corresponding to a plurality of downlink RF spectrum chunks, respectively, based on the at least one downlink communications stream. Each of the plurality of downlink RF spectrum chunks comprises one or more downlink RF spectrums generated from one or more of the plurality of downlink spectrums in the at least one downlink spectrum chunk. The processing circuit is also configured to determine a selected downlink sector communications signal among the plurality of downlink sector communications signals to be transmitted at a selected power from a selected sector RF path among the plurality of sector RF paths in a selected downlink RF spectrum among the one or more downlink RF spectrums in a selected downlink RF spectrum chunk among the plurality of downlink RF spectrum chunks. The processing circuit is also configured to provide the selected downlink sector communications signal to the selected sector RF path.

In another aspect, a method for supporting RF spectrum-based coverage area optimization in a remote unit in a WDS is provided. The method includes receiving at least one downlink communications stream corresponding to at least one downlink spectrum chunk comprising a plurality of downlink spectrums. The method also includes generating a plurality of downlink sector communications signals corresponding to a plurality of downlink RF spectrum chunks, respectively, based on the at least one downlink communications stream. Each of the plurality of downlink RF spectrum chunks comprises one or more downlink RF spectrums generated from one or more of the plurality of downlink spectrums in the at least one downlink spectrum chunk. The method also includes determining a selected downlink sector communications signal among the plurality of downlink sector communications signals to be transmitted at a selected power from a selected sector RF path among a plurality of sector RF paths in a selected downlink RF spectrum among the one or more downlink RF spectrums in a selected downlink RF spectrum chunk among the plurality of downlink RF spectrum chunks. The method also includes providing the selected downlink sector communications signal to the selected sector RF path.

In another aspect, a WDS is provided. The WDS includes a plurality of remote units. The plurality of remote units is configured to receive and convert a plurality of downlink communications signals into a plurality of downlink RF communications signals for distribution to client devices. The plurality of remote units is also configured to receive a plurality of uplink RF communications signals from the client devices and convert the plurality of uplink RF communications signals into a plurality of uplink communications signals. The WDS also includes a central unit. The central unit is configured to distribute the plurality of downlink communications signals to the plurality of remote units over a downlink communications medium. The central unit is also configured to receive the plurality of uplink communications signals from the plurality of remote units over an uplink communications medium. At least one selected remote unit among the plurality of remote units includes a plurality of sector RF paths. Each of the plurality of sector RF paths includes an antenna configured to distribute a respective downlink sector communications signal. The at least one selected remote unit also includes a data stream constructor-deconstructor circuit. The data stream constructor-deconstructor circuit is configured to receive a downlink communications signal among the plurality of downlink communications signals. The data stream constructor-deconstructor circuit is also configured to deconstruct the downlink communications signal to generate at least one downlink communications stream corresponding to at least one downlink spectrum chunk comprising a plurality of downlink spectrums. The at least one selected remote unit also includes a processing circuit. The processing circuit is configured to receive the at least one downlink communications stream from the data stream constructor-deconstructor circuit. The processing circuit is also configured to generate a plurality of downlink sector communications signals corresponding to a plurality of downlink RF spectrum chunks, respectively, based on the at least one downlink communications stream. Each of the plurality of downlink RF spectrum chunks comprises one or more downlink RF spectrums generated from one or more of the plurality of downlink spectrums in the at least one downlink spectrum chunk. The processing circuit is also configured to determine a selected downlink sector communications signal among the plurality of downlink sector communications signals to be transmitted at a selected power from a selected sector RF path among the plurality of sector RF paths in a selected downlink RF spectrum among the one or more downlink RF spectrums in a selected downlink RF spectrum chunk among the plurality of downlink RF spectrum chunks. The processing circuit is also configured to provide the selected downlink sector communications signal to the selected sector RF path.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiments, and together with the description serve to explain principles and operation of the various embodiments.

BRIEF DESCRIPTION OF THE DRAWINGS

FIGS. 10A and 10B are schematic diagrams providing exemplary illustrations of a first remote unit, a second remote unit, and a third remote unit configured to optimize performance experience of a mobile user;

DETAILED DESCRIPTION

Embodiments of the disclosure relate to a remote unit supporting radio frequency (RF) spectrum-based coverage area optimization in a wireless distribution system (WDS). A remote unit in a WDS includes a plurality of sector RF paths configured to support sectored coverage areas around the remote unit. Each of the sector RF paths includes an antenna configured to communicate an RF communications signal(s) in an RF spectrum(s) (e.g., band or channel). A processing circuit in the remote unit is configured to support RF spectrum-based coverage optimization in the sectored coverage areas. In one aspect, the processing circuit determines a selected downlink sector communications signal(s) to be distributed at a selected power from a selected sector RF path(s) in a selected RF spectrum(s) and provides the selected downlink sector communications signal(s) to the selected sector RF path(s) for distribution in a respective sectored coverage area. In this manner, the processing circuit can independently configure a sector RF path(s) to distribute a downlink RF communications signal(s) in an RF spectrum(s) at a desired power(s), thus enabling directional capacity optimization and/or RF interference mitigation around the remote unit.

Figure 1:
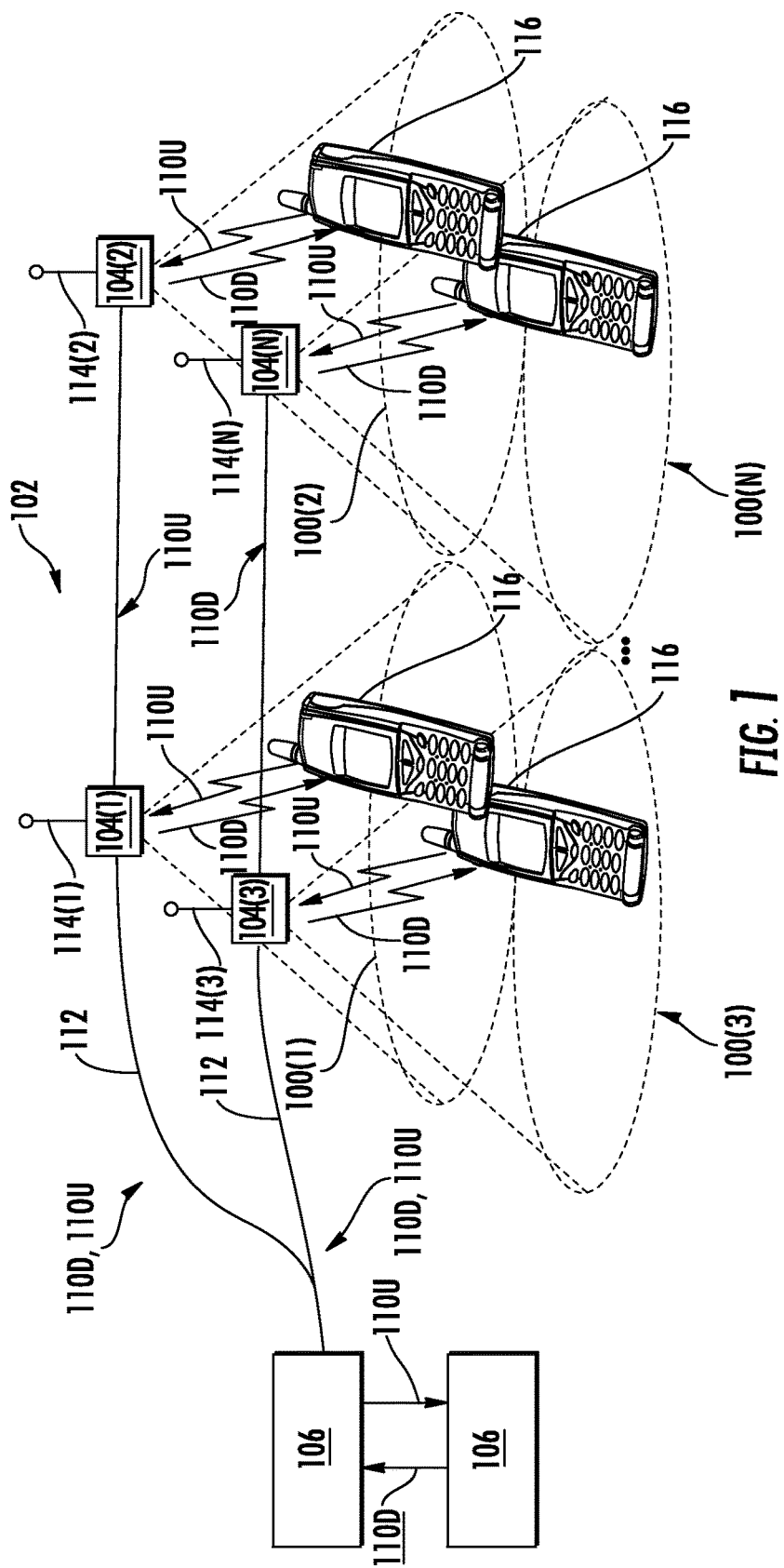
FIG. 1 is a schematic diagram of an exemplary wireless distribution system (WDS)
Figure 2:
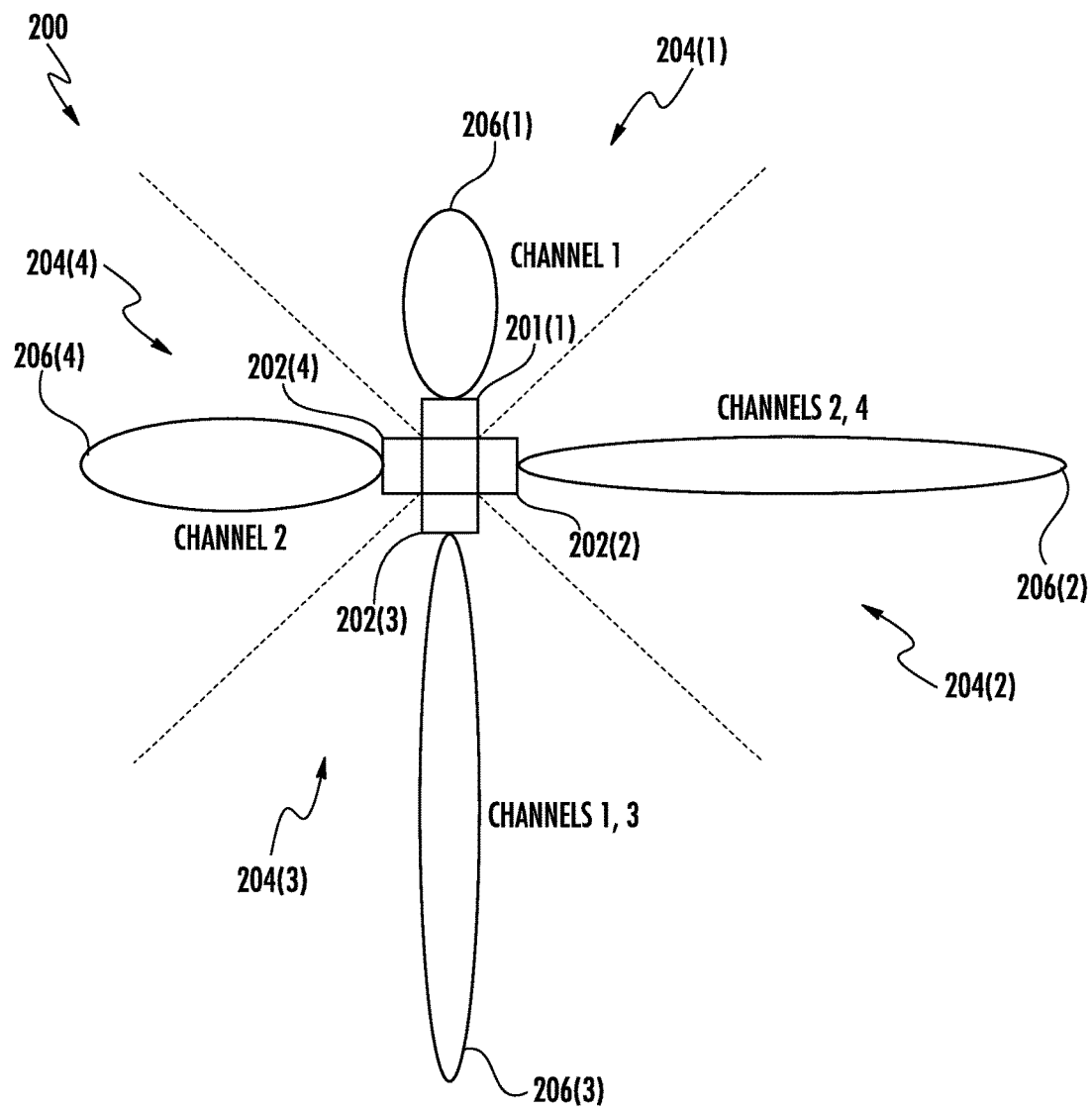
FIG. 2 is a schematic diagram of an exemplary sectored antenna system including sector antennas configured to support sectored coverage areas, respectively.

Before discussing exemplary aspects of a remote unit with multiple sector RF paths that includes specific aspects of the present disclosure, a brief overview of a sectored antenna system is first provided in FIG. 2. The discussion of exemplary aspects of a remote unit configured to support RF spectrum-based coverage area optimization starts with reference to FIG. 3.

In this regard FIG. 2 is a schematic diagram of an exemplary sectored antenna system 200 including sector antennas 202(1)-202(4) configured to support sectored coverage areas 204(1)-204(4), respectively. In a non-limiting example, the sector antennas 202(1)-202(4) are directional antennas configured to distribute RF signals 206(1)-206(4) in respective radiation directions. The sector antennas 202(1)-202(4) may be coupled to power amplifiers configured to amplify the RF signals 206(1)-206(4) to desired powers, thus controlling coverage range of the sectored coverage areas 204(1)-204(4). Each of the RF signals 206(1)-206(4) may occupy a respective RF channel(s) or band(s). For example, the RF signal 206(1) occupies channel 1, the RF signal 206(2) occupies channels 2 and 4, the RF signal 206(3) occupies channels 1 and 3, and the RF signal 206(4) occupies channel 2. In this regard, when the RF signals 206(1)-206(4) are amplified to the desired powers, the RF signals 206(1)-206(4) are amplified in all of the RF channels. For example, when the RF signal 206(2) is amplified, the RF signal 206(2) is amplified in both channels 2 and 4.

In a non-limiting example, the RF signal 206(2) can suffer RF interference(s) in channel 2, while causing RF interference(s) in channel 4 in the sectored coverage area 204(2). As such, it may be necessary to increase power of the RF signal 206(2) in channel 2 to mitigate the RF interference(s) in channel 2, while reducing power of the RF signal 206(2) in channel 4 to reduce the RF interference(s) in channel 4. In another non-limiting example, the RF signal 206(3) needs to be received in channel 3 by a number of new users located farther away from the sector antenna 202(3). As a result, it may be necessary to increase power of the RF signal 206(3) in channel 3 to increase directional capacity in the sectored coverage area 204(3). In this regard, it may be desired to independently adjust powers of the RF signals 206(1)-206(4) in selected RF channels to help provide directional capacity optimization and/or RF interference mitigation in the sectored coverage areas 204(1)-204(4).

Figure 3:
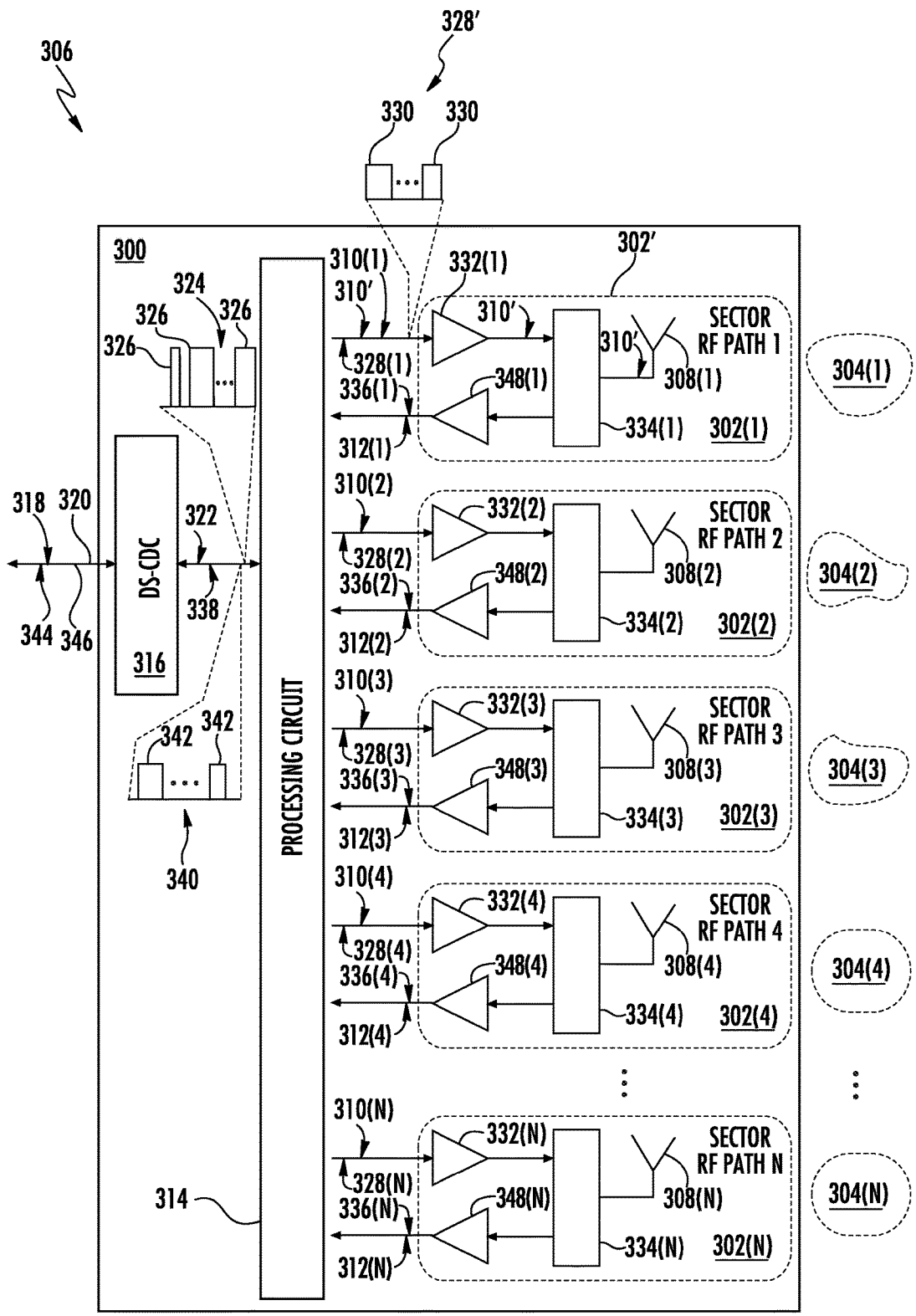
FIG. 3 is a schematic diagram of an exemplary remote unit configured to support radio frequency (RF) spectrum-based coverage area optimization by configuring a plurality of sector RF paths in the remote unit to enable RF spectrum-based power control in a plurality of sectored coverage areas in a WDS.

In this regard, FIG. 3 is a schematic diagram of an exemplary remote unit 300 configured to support RF spectrum-based coverage area optimization by configuring a plurality of sector RF paths 302(1)-302(N) in the remote unit 300 to enable RF spectrum-based power control in a plurality of sectored coverage areas 304(1)-304(N) in a WDS 306. In the exemplary aspects discussed herein, an RF spectrum(s) refers an RF channel(s) or an RF band(s) occupied by an RF communications signal. In this regard, RF spectrum-based power control refers to controlling (e.g., increasing or decreasing) transmit power or receive-sensitivity (thus affecting received power) of the RF communications signal independently based on the RF channel(s) or the RF band(s) occupied by the RF communications signal. Accordingly, RF spectrum-based coverage area optimization refers to extending or reducing coverage range of the RF communications signal in the RF channel(s) or the RF band(s) by means of the RF spectrum-based power control. As discussed below, the RF spectrum-based power control can be achieved in a digital domain via digital power conditioning, or in an analog domain via power amplification or attenuation. By configuring the remote unit 300 to support RF spectrum-based coverage area optimization, it is possible to enable directional capacity optimization and/or RF interference mitigation around the remote unit 300, thus improving RF coverage and user experiences in the WDS 306.

With reference to FIG. 3, the sector RF paths 302(1)-302(N) include a plurality of antennas 308(1)-308(N) configured to distribute a plurality of downlink sector communications signals 310(1)-310(N) and receive a plurality of uplink sector communications signals 312(1)-312(N) in the sectored coverage areas 304(1)-304(N), respectively. The remote unit 300 includes a processing circuit 314, which may be implemented by a field-programmable gate array (FPGA), a microprocessor, a digital signal processor (DSP), a microcontroller, or a combination thereof. The processing circuit 314 is configured to independently configure the sector RF paths 302(1)-302(N) to enable RF spectrum-based power control in the sectored coverage areas 304(1)-304(N). The remote unit 300 also includes a data stream constructor-deconstructor circuit (DS-CDC) 316 communicatively coupled to a central unit in the WDS 306.

In downlink aspects, The DS-CDC 316 receives a downlink communications signal 318 from the central unit in the WDS 306 over a downlink communications medium 320. The DS-CDC 316 deconstructs the downlink communications signal 318 to generate at least one downlink communications stream 322 corresponding to at least one downlink spectrum chunk 324 and provides the downlink communications stream 322 to the processing circuit 314. In the exemplary aspects discussed herein, a spectrum chunk refers to in-phase/quadrature (I/Q) samples representing signals within a certain frequency range, which is defined by a starting frequency and an ending frequency, configured to include one or more spectrums, such as channels or bands. In this regard, the downlink spectrum chunk 324 may include a plurality of downlink spectrums 326 (e.g., channels or bands). The processing circuit 314 receives the downlink communications stream 322 from the DS-CDC 316. The processing circuit 314 generates the downlink sector communications signals 310(1)-310(N) corresponding to a plurality of downlink RF spectrum chunks 328(1)-328(N), respectively, based on the downlink communications stream 322.

Each of the downlink RF spectrum chunks 328(1)-328(N) includes one or more downlink RF spectrums 330 generated from one or more of the downlink spectrums 326 in the downlink spectrum chunk 324. In a non-limiting example, the downlink RF spectrum chunks 328(1)-328(N) can be determined based on communications services to be conveyed by the downlink sector communications signals 310(1)-310(N). In this regard, the processing circuit 314 may utilize a configuration matrix to determine the downlink RF spectrums 330 for each of the downlink RF spectrum chunks 328(1)-328(N) and assign the downlink RF spectrum chunks 328(1)-328(N) to the downlink sector communications signals 310(1)-310(N), respectively. Notably, it is possible to configure one or more of the downlink RF spectrum chunks 328(1)-328(N) to include different downlink RF spectrums. However, it is also possible to configure one or more of the downlink RF spectrum chunks 328(1)-328(N) to include the same downlink RF spectrums. For example, the downlink RF spectrum chunk 328(1) may include the downlink RF spectrums 330 corresponding to downlink RF channels 1 and 4, the downlink RF spectrum chunks 328(2), 328(4) may both include the downlink RF spectrums 330 corresponding to downlink RF channels 2 and 3, and the downlink RF spectrum chunk 328(3) may include the downlink RF spectrum 330 corresponding to downlink RF channel 1.

The processing circuit 314 is configured to determine a selected downlink sector communications signal among the downlink sector communications signals 310(1)-310(N) to be transmitted at a selected power from a selected sector RF path among the sector RF paths 302(1)-302(N) in a selected downlink RF spectrum among the downlink RF spectrums 330 in a selected downlink RF spectrum chunk among the downlink RF spectrum chunks 328(1)-328(N). The processing circuit 314 is further configured to provide the selected downlink sector communications signal to the selected sector RF path for distribution in a respective sectored coverage area among the sectored coverage areas 304(1)-304(N). For the convenience of reference and illustration, the downlink sector communications signal 310(1) is referenced and discussed hereinafter as the selected downlink sector communications signal 310'. Accordingly, the downlink RF spectrum chunk 328(1) and the sector RF path 302(1) are referenced hereinafter as the selected downlink RF spectrum chunk 328' and the selected sector RF path 302', respectively.

It shall be appreciated that the selected downlink sector communications signal 310' can be any of the downlink sector communications signals 310(1)-310(N). It shall be further appreciated that the selected downlink sector communications signal 310' is by no means limited to a single downlink sector communications signal among the downlink sector communications signals 310(1)-310(N). Likewise, the selected downlink RF spectrum chunk 328' can be any of the downlink RF spectrums 330 in any of the downlink RF spectrum chunks 328(1)-328(N), and the selected sector RF path 302' can be any of the sector RF paths 302(1)-302(N). In this manner, the processing circuit 314 can independently configure any of the sector RF paths 302(1)-302(N) to control the respective power based on any of the downlink RF spectrums 330 in any of the downlink RF spectrum chunks 328(1)-328(N). As a result, the remote unit 300 can support RF spectrum-based coverage area optimization, thus enabling directional capacity optimization and/or RF interference mitigation around the remote unit 300.

The remote unit 300 can be configured to support RF spectrum-based coverage optimization according to a process. In this regard, FIG. 4 is a flowchart of an exemplary process 400 that can be employed by the remote unit 300 of FIG. 3 to support RF spectrum-based coverage area optimization in the sectored coverage areas 304(1)-304(N) of the remote unit 300.

Figure 4:
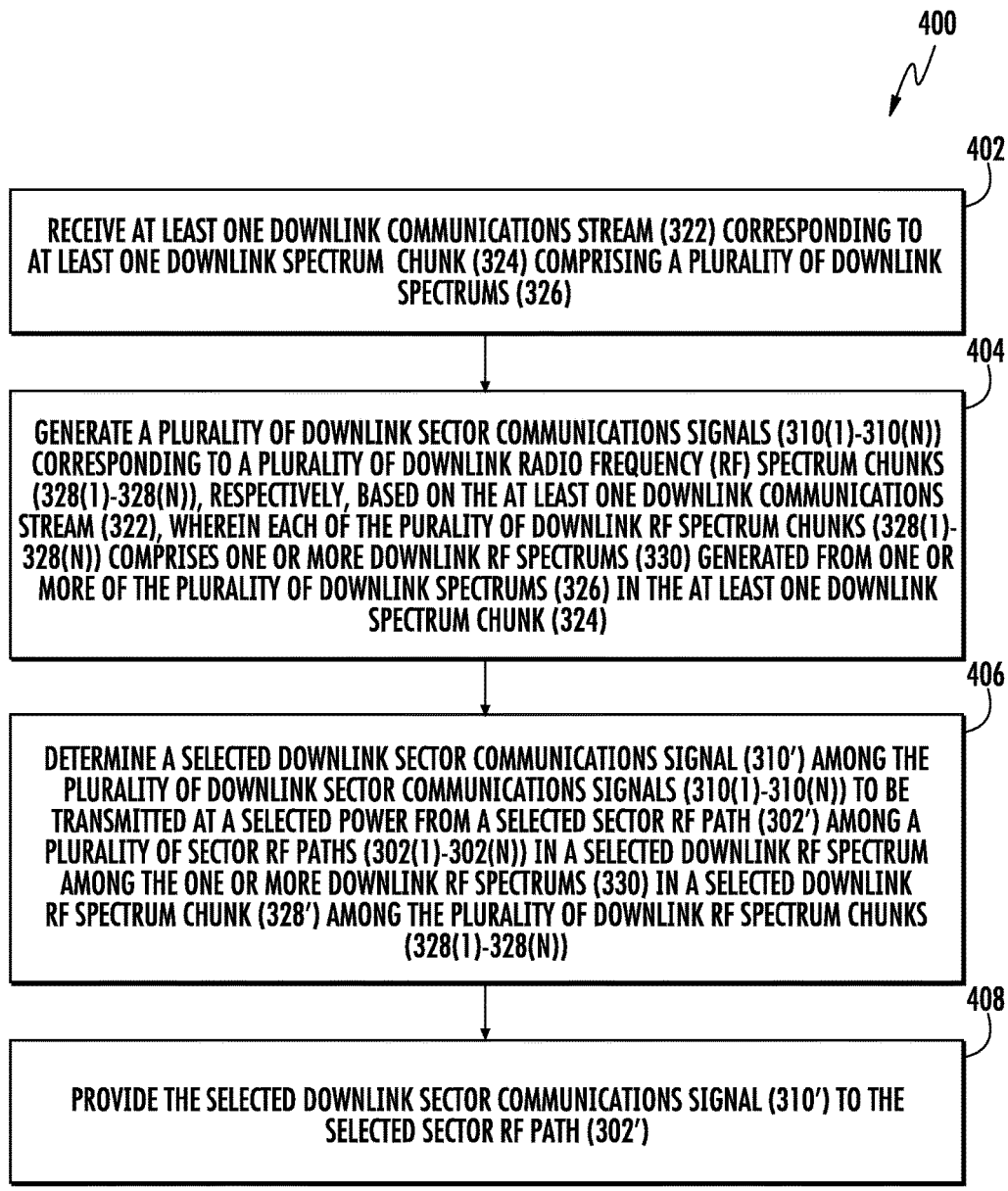
FIG. 4 is a flowchart of an exemplary process that can be employed by the remote unit of FIG. 3 to support RF spectrum-based coverage area optimization in sectored coverage areas of the remote unit.

With reference to FIG. 4, the processing circuit 314 receives the downlink communications stream 322 corresponding to the downlink spectrum chunk 324 that includes the downlink spectrums 326 (block 402). The processing circuit 314 generates the downlink sector communications signals 310(1)-310(N) corresponding to the downlink RF spectrum chunks 328(1)-328(N), respectively, based on the downlink communications stream 322. Each of the downlink RF spectrum chunks 328(1)-328(N) includes the downlink RF spectrums 330 generated from one or more of the downlink spectrums 326 in the downlink spectrum chunk 324 (block 404). The processing circuit 314 determines the selected downlink sector communications signal 310' among the downlink sector communications signals 310(1)-310(N) to be transmitted at the selected power from the selected sector RF path 302' among the sector RF paths 302(1)-302(N) in the selected downlink RF spectrum among the downlink RF spectrums 330 in the selected downlink RF spectrum chunk 328' among the downlink RF spectrum chunks 328(1)-328(N) (block 406). The processing circuit 314 provides the selected downlink sector communications signal 310' to the selected sector RF path 302' (block 408).

Figure 5:
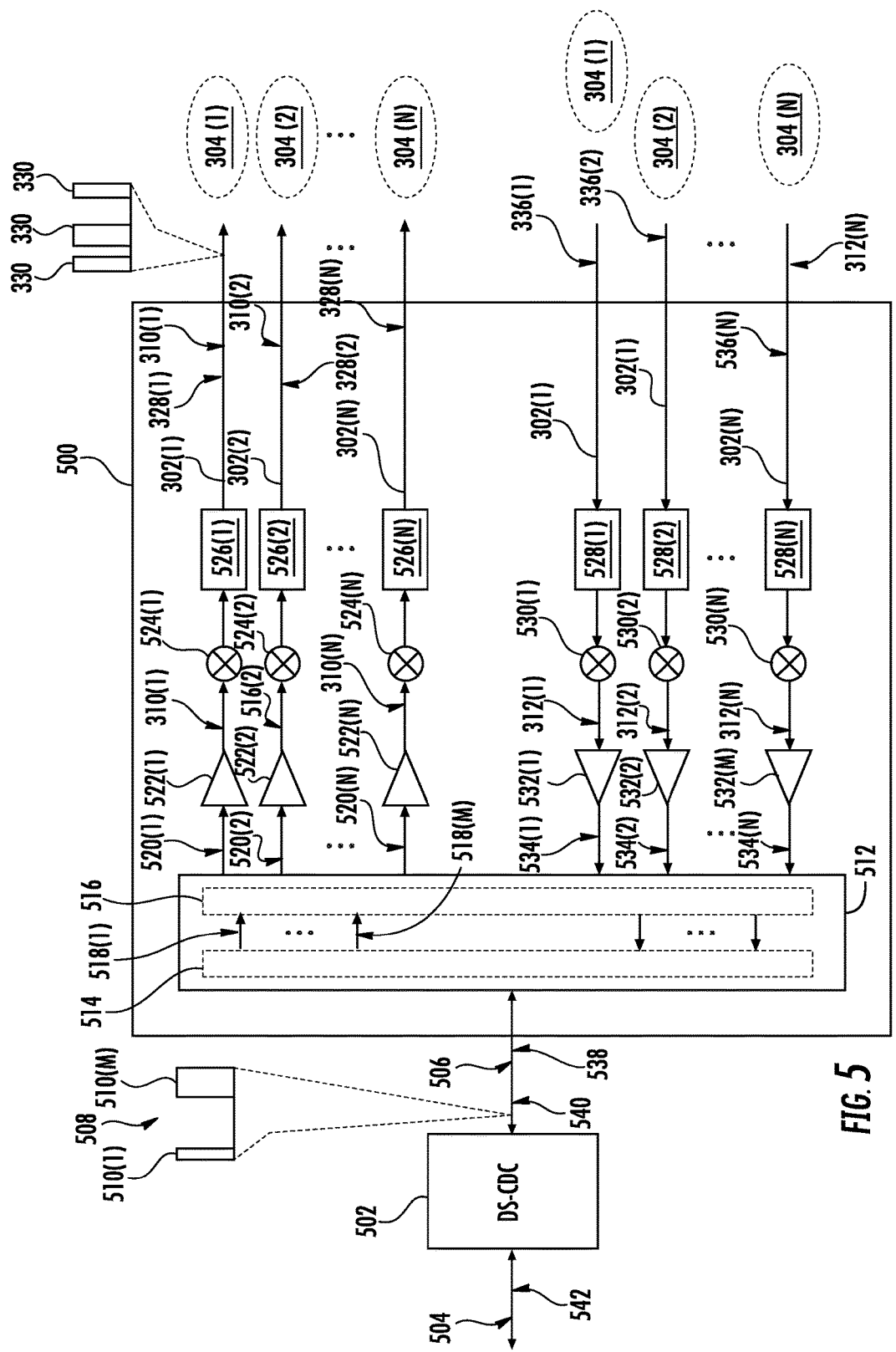
FIG. 5 is a schematic diagram of an exemplary processing circuit that can be provided in the remote unit of FIG. 3 to support RF spectrum-based power control based on digital power conditioning.

As previously mentioned, the RF spectrum-based power control can be achieved in a digital domain via digital power conditioning. In this regard, FIG. 5 is a schematic diagram of an exemplary processing circuit 500 that can be provided in the remote unit 300 of FIG. 3 to support RF spectrum-based power control based on digital power conditioning. Common elements between FIGS. 3 and 5 are shown therein with common element numbers and will not be re-described herein.

With reference to FIG. 5, the processing circuit 500 is communicatively coupled to a DS-CDC 502. In a non-limiting example, the DS-CDC 502 and the processing circuit 500 can be provided in the remote unit 300 of FIG. 3 as the DS-CDC 316 and the processing circuit 314, respectively. The DS-CDC 502 is configured to receive a downlink digital communications signal 504 from a central unit in a WDS. In a non-limiting example, the DS-CDC 502 receives the downlink digital communications signal 504 based on a common public radio interface (CPRI) protocol. The DS-CDC 502 deconstructs the downlink digital communications signal 504 to generate at least one downlink digital communications stream 506 that corresponds to at least one downlink digital spectrum chunk 508. In a non-limiting example, the downlink digital spectrum chunk 508 includes a plurality of downlink digital spectrums 510(1)-

510(M) (e.g., digital channels or bands). The DS-CDC 502 is configured to provide the downlink digital communications stream 506 to the processing circuit 500.

The processing circuit 500 includes digital processing and routing circuitry 512 configured to receive the downlink digital communications stream 506 from the DS-CDC 502. In a non-limiting example, the digital processing and routing circuitry 512 includes digital processing circuitry 514 and digital routing circuitry 516. The digital processing circuitry 514 receives the downlink digital communications stream 506 and generates a plurality of downlink digital sector communications signals 518(1)-518(M) based on the downlink digital communications stream 506. In a non-limiting example, the downlink digital sector communications signals 518(1)-518(M) correspond respectively to the downlink digital spectrums 510(1)-510(M) conveyed in the downlink digital spectrum chunk 508. For example, the downlink digital sector communications signal 518(1) corresponds to the downlink digital spectrum 510(1), the downlink digital sector communications signal 518(2) corresponds to the downlink digital spectrum 510(2), and so on. Notably, it is not necessary to maintain a one-to-one matchup between the downlink digital sector communications signals 518(1)-518(M) and the downlink digital spectrums 510(1)-510(M). In this regard, it is also possible to associate each of the downlink digital sector communications signals 518(1)-518(M) with more than one of the downlink digital spectrums 510(1)-510(M). For example, the downlink digital sector communications signal 518(1) can be configured to correspond to the downlink digital spectrums 510(1), 510(2).

The digital routing circuitry 516 receives the downlink digital sector communications signals 518(1)-518(M). The digital routing circuitry 516 is configured to generate a plurality of downlink digital sector communications signals 520(1)-520(N) that correspond to the downlink sector communications signals 310(1)-310(N), respectively. More specifically, the digital routing circuitry 516 is configured to determine the downlink RF spectrum chunks 328(1)-328(N) for the downlink sector communications signals 310(1)-310(N) based the communications services to be conveyed by the downlink sector communications signals 310(1)-310(N). In this regard, the digital routing circuitry 516 may utilize a configuration matrix to determine how the downlink digital sector communications signals 518(1)-518(M) are assigned to each of the downlink digital sector communications signals 520(1)-520(N). Notably, each of the downlink digital sector communications signals 520(1)-520(N) can be configured to correspond with one or more of the downlink digital sector communications signals 518(1)-518(M). For example, the downlink digital sector communications signal 520(1) can correspond to the downlink digital sector communications signals 518(1)-518(3), the downlink digital sector communications signal 520(2) can correspond to the downlink digital sector communications signal 518(2), and the downlink digital sector communications signal 520(3) can correspond to the downlink digital sector communications signals 518(2) and 518(4). Accordingly, the downlink RF spectrum chunk 328(1) corresponds to the downlink digital spectrums 510(1)-510(3), the downlink RF spectrum chunk 328(2) corresponds to the downlink digital spectrum 510(2), and the downlink RF spectrum chunk 328(3) corresponds to downlink digital spectrums 510(2), 510(4).

The processing circuit 500 includes a plurality of digital-to-analog converters (DACs) 522(1)-522(N) configured to convert the downlink digital sector communications signals 520(1)-520(N) into the downlink sector communications signals 310(1)-310(N), respectively. Notably, alternative to employing the DACs 522(1)-522(N), it may also be possible to employ a lesser number of broadband DACs in the processing circuit 500 to convert the downlink digital sector communications signals 520(1)-520(N) into the downlink sector communications signals 310(1)-310(N). The processing circuit 500 may include a plurality of frequency up-converters 524(1)-524(N) configured to up-shift frequencies of the downlink sector communications signals 310(1)-310(N), respectively. The processing circuit 500 may also include a plurality of downlink pass filters 526(1)-526(N) to provide frequency filtering on the downlink sector communications signals 310(1)-310(N), respectively.

The digital processing and routing circuitry 512 may be further configured to perform digital power conditioning. In this regard, the digital processing and routing circuitry 512 determines at least one selected downlink digital sector communications signal among the downlink digital sector communications signals 520(1)-520(N) having a respective downlink digital spectrum corresponding to the selected downlink RF spectrum of the selected downlink sector communications signal 310' among the downlink sector communications signals 310(1)-310(N). For example, the digital processing and routing circuitry 512 determines that the selected downlink RF spectrum in the selected downlink RF spectrum chunk 328' of the selected downlink sector communications signal 310' corresponds to the downlink digital spectrum 510(2). As a result, the digital processing and routing circuitry 512 selects and performs digital power conditioning on the downlink digital sector communications signal 520(2). In a non-limiting example, the digital processing and routing circuitry 512 can perform the digital power conditioning on the selected downlink digital sector communications signal 520(2) by adjusting magnitude, phase, and/or equalization of the selected downlink digital sector communications signal. As a result, it may be possible to provide power control at a granularity of downlink digital spectrum (e.g., channel or band), thus helping to improve RF coverage and user experiences in the sectored coverage areas 304(1)-304(N).

With reference back to FIG. 3, the sector RF paths 302(1)-302(N) include a plurality of power amplifier-attenuator circuits 332(1)-332(N), respectively. The power amplifier-attenuator circuits 332(1)-332(N) are coupled to the antennas 308(1)-308(N) via a plurality of coupling circuits 334(1)-334(N), respectively. In this regard, the selected sector RF path 302' includes the power amplifier-attenuator circuit 332(1) coupled to the antenna 308(1) via the coupling circuit 334(1). In one non-limiting example, the power amplifier-attenuator circuit 332(1) can be configured to amplify the selected downlink sector communications signal 310' to the selected power, thus extending downlink RF coverage in the selected downlink RF spectrum in the sectored coverage area 304(1). In another non-limiting example, the power amplifier-attenuator circuit 332(1) can be configured to attenuate the selected downlink sector communications signal 310' to the selected power, thus reducing downlink RF coverage in the selected downlink RF spectrum in the sectored coverage area 304(1).

Figure 6:
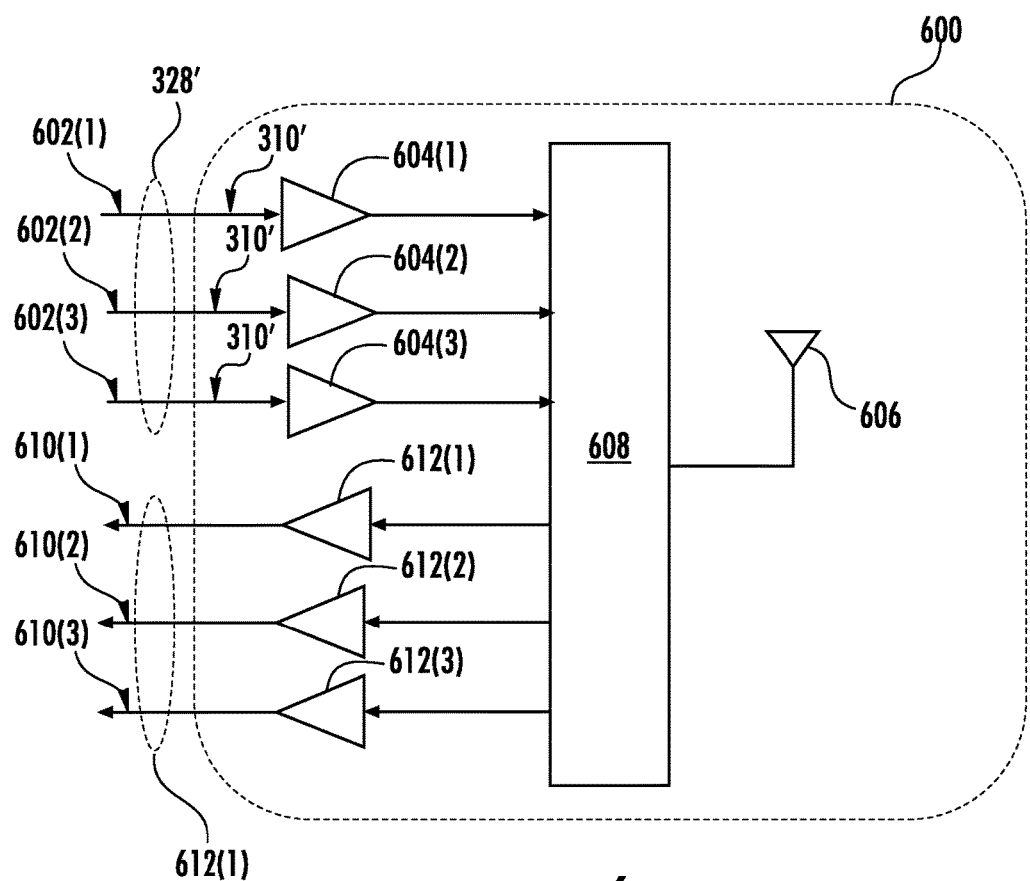
FIG. 6 is a schematic diagram of an exemplary sector RF path that can be provided in the remote unit of FIG. 3 to support RF spectrum-based power control based on power amplification or attenuation.

As previously mentioned, the RF spectrum-based power control can also be achieved in analog domain via power amplification or attenuation. As such, the selected sector RF path 302' can be configured to include a respective power amplifier-attenuator circuit for each of the downlink RF spectrums in the selected downlink RF spectrum chunk 328'. In this regard, FIG. 6 is a schematic diagram of an exemplary sector RF path 600 that can be provided in the selected sector RF path 302' in the remote unit 300 of FIG. 3 to support RF spectrum-based power control based on power amplification or attenuation. Common elements between FIGS. 3 and 6 are shown therein with common element numbers and will not be re-described herein.

In a non-limiting example, the sector RF path 600 receives the selected downlink sector communications signal 310' corresponding to the selected downlink RF spectrum chunk 328' that includes downlink RF spectrums 602(1)-603(3). Accordingly, the sector RF path 600 includes a plurality of power amplifier-attenuator circuits 604(1)-604(3) that are coupled to an antenna 606 via a coupling circuit 608. The power amplifier-attenuator circuits 604(1)-604(3) are configured to amplify or attenuate the selected downlink sector communications signal 310' in the downlink RF spectrums 602(1)-602(3), respectively. In one non-limiting example, the processing circuit 314 in the remote unit 300 can be configured to determine a selected power amplifier-attenuator circuit among the power amplifier-attenuator circuits 604(1)-604(3) to amplify the selected downlink sector communications signal 310' to extend downlink RF coverage in the selected downlink RF spectrum. In another non-limiting example, the processing circuit 314 in the remote unit 300 can be configured to determine the selected power amplifier-attenuator circuit among the power amplifier-attenuator circuits 604(1)-604(3) to attenuate the selected downlink sector communications signal 310' to reduce downlink RF coverage in the selected downlink RF spectrum. For example, if the selected downlink RF spectrum is the downlink RF spectrum 602(2), the processing circuit 314 would select the power amplifier-attenuator circuit 604(2) to amplify or attenuate the selected downlink sector communications signal 310' in the selected downlink RF spectrum 602(2).

The sector RF path 600 may receive the uplink sector communications signal 312(1) that includes uplink RF spectrums 610(1)-610(3). Accordingly, the sector RF path 600 may include a plurality of low-noise amplifiers (LNAs) 612(1)-612(3) to control received power of the uplink sector communications signal 312(1) in the uplink RF spectrums 610(1)-610(3), respectively.

With reference back to FIG. 3, in uplink aspects, the sector RF paths 302(1)-302(N) receive the uplink sector communications signals 312(1)-312(N), respectively. The uplink sector communications signals 312(1)-312(N) correspond respectively to a plurality of uplink RF spectrum chunks 336(1)-336(N). Each of the uplink RF spectrum chunks 336(1)-336(N) includes one or more uplink RF spectrums. The processing circuit 314 is configured to generate at least one uplink communications stream 338 based on the uplink sector communications signals 312(1)-312(N). The uplink communications stream 338 corresponds to at least one uplink spectrum chunk 340 that includes a plurality of uplink spectrums 342 generated based on the uplink RF spectrum chunks 336(1)-336(N). The DS-CDC 316 receives the uplink communications stream 338 from the processing circuit 314 and constructs an uplink communications signal 344 based on the uplink communications stream 338. The DS-CDC 316 then provides the uplink communications signal 344 to the central unit in the WDS 306 over an uplink communications medium 346. The sector RF paths 302(1)-302(N) may include a plurality of LNAs 348(1)-348(N), respectively. In a non-limiting example, the processing circuit 314 can increase or decrease receive-sensitivity (e.g., by controlling a respective LNA among the LNAs 348(1)-348(N)) of a second selected sector RF path among the sector RF paths 302(1)-302(N) to respectively extend or reduce uplink RF coverage in a selected uplink RF spectrum among the uplink RF spectrum chunks 336(1)-336(N).

With reference back to FIG. 5, the processing circuit 500 receives the uplink sector communications signals 312(1)-312(N). The processing circuit 500 may include a plurality of uplink pass filters 528(1)-528(N) configured to provide frequency filtering on the uplink sector communications signals 312(1)-312(N), respectively. The processing circuit 500 may include a plurality of frequency down-converters 530(1)-530(N) configured to down-shift frequencies of the uplink sector communications signals 312(1)-312(N), respectively. The processing circuit 500 includes a plurality of analog-to-digital converters (ADCs) 532(1)-532(N) configured to covert the uplink sector communications signals 312(1)-312(N) into a plurality of uplink digital sector communications signals 534(1)-534(N), respectively. The digital routing circuitry 516 is configured to generate a plurality of uplink digital sector communications signals 563(1)-536(M) based on the uplink digital sector communications signals 534(1)-534(N). The digital processing circuitry 514 is configured to generate at least one uplink digital communications stream 538 that corresponds to at least one uplink digital spectrum chunk 540 based on the uplink digital sector communications signals 536(1)-536(M). The digital processing circuitry 514 is further configured to provide the uplink digital communications stream 538 to the DS-CDC 502. The DS-CDC 502 constructs an uplink digital communications signal 542 based on the uplink digital communications stream 538 and provides the uplink digital communications signal 542 to the central unit in the WDS.

With reference back to FIG. 3, the processing circuit 314 can be configured to support different RF coverage areas around the remote unit 300 based on different RF spectrums. In a non-limiting example, the processing circuit 314 may determine a first selected downlink sector communications signal among the downlink sector communications signals 310(1)-310(N) to be transmitted at a first selected power from a first selected sector RF path among the sector RF paths 302(1)-302(N) in a first selected downlink RF spectrum. The processing circuit 314 may further determine a second selected downlink sector communications signal among the downlink sector communications signals 310(1)-310(N) to be transmitted at a second selected power from a second selected sector RF path among the sector RF paths 302(1)-302(N) in a second selected downlink RF spectrum. The processing circuit 314 can thus provide the first selected downlink sector communications signal and the second selected downlink sector communications signal to the first selected sector RF path and the second selected sector RF path, respectively. In this manner, the remote unit 300 can be configured to provide RF spectrum-based coverage area optimization in a variety of deployment scenarios.

To help illustrate some of the RF spectrum-based coverage area optimization scenarios that can be supported by the remote unit 300, FIGS. 7, 8, 9A-9B, and 10A-10B are discussed next. For the convenience of illustration, FIGS. 7, 8, 9A-9B, and 10A-10B are discussed based on remote units, which include four-sector RF paths configured to support four respective sectored coverage areas. It shall be appreciated that the configuration and operation principles discussed herein are generally applicable to any multi-sector (e.g., three-sector, six-sector, eight-sector, etc.) remote units. Elements of FIG. 3 are referenced in conjunction with FIGS. 7, 8, 9A-9B, and 10A-10B and will not be re-described herein.

Figure 7:
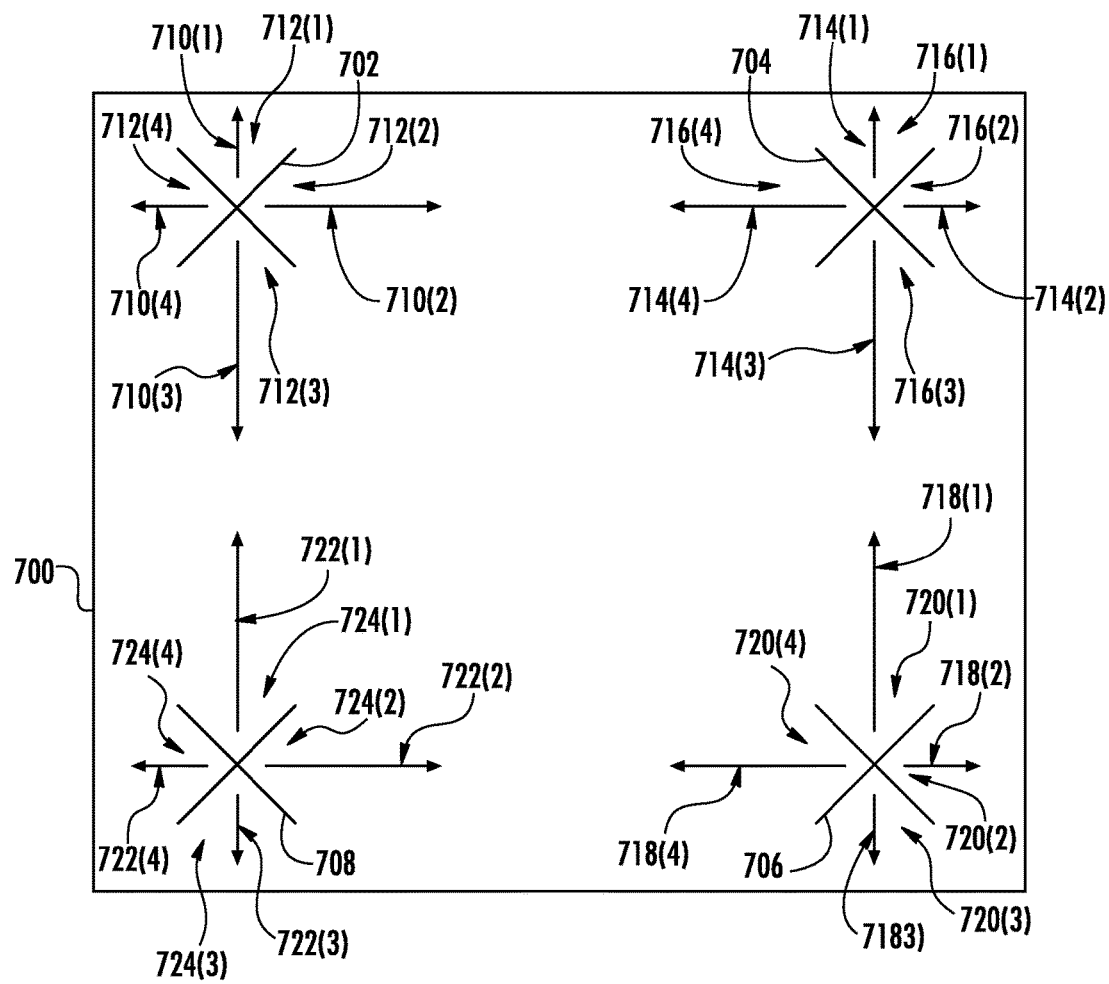
FIG. 7 is a schematic diagram of an exemplary WDS including a first remote unit, a second remote unit, a third remote unit, and a fourth remote unit.

In this regard, FIG. 7 is a schematic diagram of an exemplary WDS 700 including a first remote unit 702, a second remote unit 704, a third remote unit 706, and a fourth remote unit 708. In a non-limiting example, the WDS 700 can be deployed inside a building to cover a floor area. The first remote unit 702 is configured to transmit first downlink sector communications signals 710(1)-710(4) in first sectored coverage areas 712(1)-712(4), respectively. In a non-limiting example, the first downlink sector communications signals 710(1), 710(4) are both distributed in RF channel 3, and the first downlink sector communications signals 710(2), 710(3) are both distributed in RF channels 1, 2, and 3. The second remote unit 704 is configured to transmit second downlink sector communications signals 714(1)-714(4) in second sectored coverage areas 716(1)-716(4), respectively. In a non-limiting example, the second downlink sector communications signals 714(1), 714(2) are both distributed in RF channel 3, and the second downlink sector communications signals 714(3), 714(4) are both distributed in RF channels 1, 2, and 3. The third remote unit 706 is configured to transmit third downlink sector communications signals 718(1)-718(4) in third sectored coverage areas 720(1)-720(4), respectively. In a non-limiting example, the third downlink sector communications signals 718(2), 718(3) are both distributed in RF channel 3, and the third downlink sector communications signals 718(1), 718(4) are both distributed in RF channels 1, 2, and 3. The fourth remote unit 708 is configured to transmit fourth downlink sector communications signals 722(1)-722(4) in fourth sectored coverage areas 724(1)-724(4), respectively. In a non-limiting example, the fourth downlink sector communications signals 722(1), 722(2) are both distributed in RF channels 1, 2, and 3, and the fourth downlink sector communications signals 722(3), 722(4) are both distributed in RF channel 3.

As shown in FIG. 7, the first downlink sector communications signals 710(1), 710(4), the second downlink sector communications signals 714(1), 714(2), the third downlink sector communications signals 718(2), 718(3), and the fourth downlink sector communications signals 722(3), 722(4) can potentially leak outside the WDS 700, thus causing RF interference(s) in RF channel 3 with wireless systems deployed outside the building in which the WDS 700 is deployed. In this regard, the first remote unit 702, the second remote unit 704, the third remote unit 706, and the fourth remote unit 708 can be configured to transmit the first downlink sector communications signals 710(1), 710(4), the second downlink sector communications signals 714(1), 714(2), the third downlink sector communications signals 718(2), 718(3), and the fourth downlink sector communications signals 722(3), 722(4) at a reduced power, thus helping to minimize potential RF interference(s) in RF channel 3.

In contrast, the first downlink sector communications signals 710(2), 710(3), the second downlink sector communications signals 714(3), 714(4), the third downlink sector communications signals 718(1), 718(4), and the fourth downlink sector communications signals 722(1), 722(2) are transmitted inside the WDS 700. Accordingly, the first remote unit 702, the second remote unit 704, the third remote unit 706, and the fourth remote unit 708 can be configured to transmit the first downlink sector communications signals 710(2), 710(3), the second downlink sector communications signals 714(3), 714(4), the third downlink sector communications signals 718(1), 718(4), and the fourth downlink sector communications signals 722(1), 722(2) at an increased power, thus helping to extend coverage and improve capacity in RF channels 1, 2, and 3.

Figure 8:
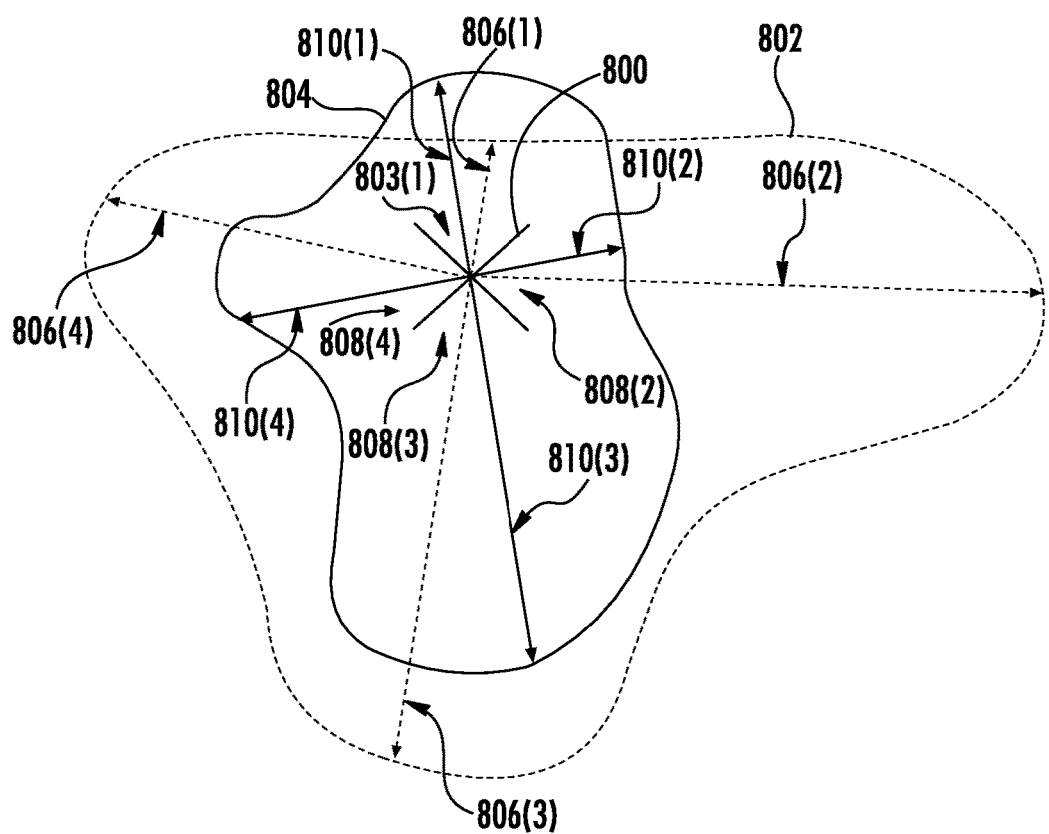
FIG. 8 is a schematic diagram of an exemplary remote unit configured to support a first RF spectrum-based coverage area and a second RF spectrum-based coverage area.

FIG. 8 is a schematic diagram of an exemplary remote unit 800 configured to support a first RF spectrum-based coverage area 802 and a second RF spectrum-based coverage area 804. As shown in FIG. 8, the remote unit 800 is configured to distribute first downlink sector communications signals 806(1)-806(4) in RF channel 1 in sectored coverage areas 808(1)-808(4), respectively. The remote unit 800 is also configured to distribute second downlink sector communications signals 810(1)-810(4) in RF channel 2 in the sectored coverage areas 808(1)-808(4), respectively. In this regard, the first RF spectrum-based coverage area 802 is based on RF channel 1, and the second RF spectrum-based coverage area 804 is based on RF channel 2.

The remote unit 800 can be configured to independently distribute the first downlink sector communications signals 806(1)-806(4) in each of the sectored coverage areas 808(1)-808(4) with different powers. Likewise, the remote unit 800 can be configured to independently distribute the second downlink sector communications signals 810(1)-810(4) in each of the sectored coverage areas 808(1)-808(4) with different powers. As a result, it is possible to customize the first RF spectrum-based coverage area 802 and the second RF spectrum-based coverage area 804.

Figure 9A:
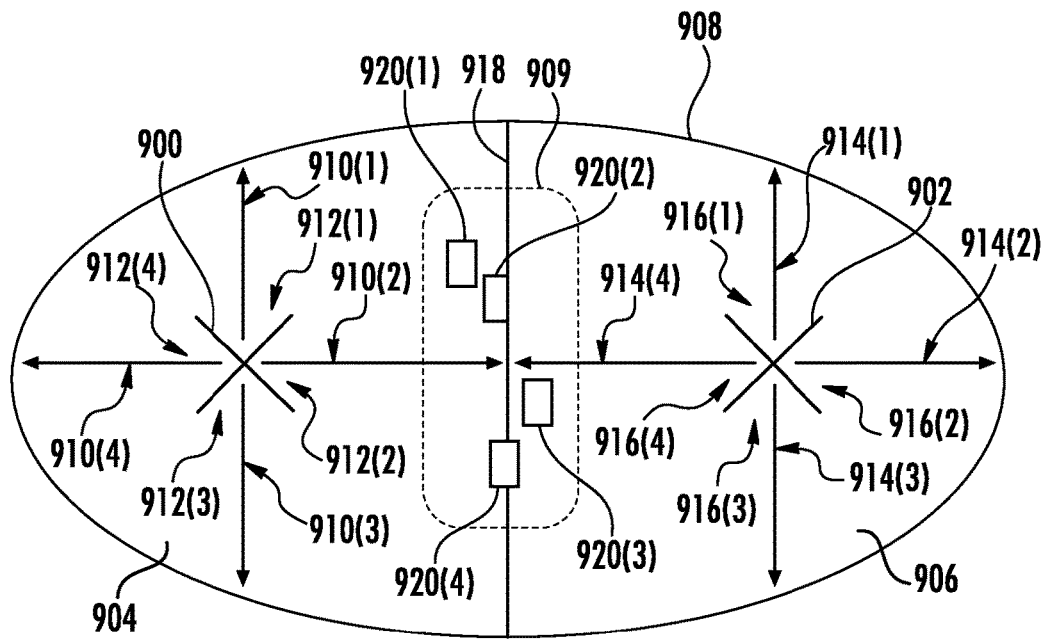
FIGS. 9A and 9B are schematic diagrams providing exemplary illustrations of a first remote unit and a second remote unit configured to adapt respective coverage areas to optimize RF spectrum-based coverage in an office area.
Figure 9B:
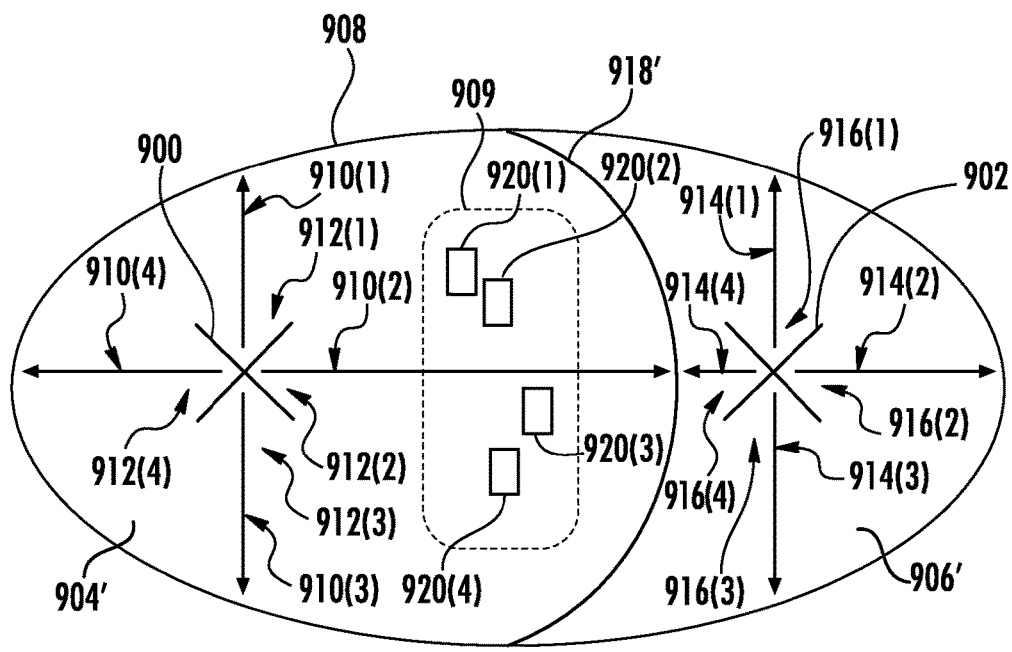

FIGS. 9A and 9B are schematic diagrams providing exemplary illustrations of a first remote unit 900 and a second remote unit 902 configured to adapt respective RF spectrum-based coverage area 904, 906 to optimize RF coverage in an office area 908. As shown in FIG. 9A, the first remote unit 900 is configured to distribute first downlink sector communications signals 910(1)-910(4) in first sectored coverage areas 912(1)-912(4), respectively. The second remote unit 902 is configured to distribute second downlink sector communications signals 914(1)-914(4) in second sectored coverage areas 916(1)-916(4), respectively. The RF spectrum-based coverage area 904 and the RF spectrum-based coverage area 906 converge along a boundary line 918.

In a non-limiting example, four users 920(1)-920(4) are located in a concentrated area 909, such as a conference room for example. The users 920(1), 920(2) are in the RF spectrum-based coverage area 904 and receive the first downlink sector communications signal 910(2) from the first remote unit 900. The user 920(3) is in the RF spectrum-based coverage area 906 and receives the second downlink sector communications signal 914(4) from the second remote unit 902. The user 920(4), however, is located on the boundary line 918. As a result, the user 920(4) will suffer such effects known as cell edge user effect. The cell edge user effect can result when the user 920(4) is located at center point between the first remote unit 900 and the second remote unit 902. In this regard, if the user 920(4) is communicating with the first remote unit 900, the second downlink sector communications signal 914(4) distributed by the second remote unit 902 can interfere with the first downlink sector communications signal 910(2) transmitted from the first remote unit 900. In addition, the user 920(4) may be bounced back and forth between receiving the first downlink sector communications signal 910(2) from the first remote unit 900 and receiving the second downlink sector communications signal 914(4) from the second remote unit 902, a phenomenon often referred to as a "Ping-Pong effect."

In this regard, to help improve RF coverage for the user 920(4), the first remote unit 900 can be configured to increase the power of the first downlink sector communications signal 910(2), while the second remote unit 902 is configured to reduce the power of the second downlink sector communications signal 914(4). As a result, as shown in FIG. 9B, the RF spectrum-based coverage area 904 of FIG. 9A is extended to an extended RF spectrum-based coverage area 904', while the RF spectrum-based coverage area 906 of FIG. 9A is reduced to a reduced RF spectrum-based coverage area 906'. The extended RF spectrum-based coverage area 904' and the reduced RF spectrum-based coverage area 906' converge along a new boundary line 918'. As a result, the office area 908 is completely covered by the extended RF spectrum-based coverage area 904', and the users 920(1)-920(4) will no longer suffer from the cell edge user effect and the "Ping-Pong effect."

FIGS. 10A and 10B are schematic diagrams providing exemplary illustrations of a first remote unit 1000, a second remote unit 1002, and a third remote unit 1004 configured to optimize performance experience of a mobile user 1006. As shown in FIG. 10A, the first remote unit 1000 is configured to distribute first downlink sector communications signals 1008(1)-1008(4) in first sectored coverage areas 1010(1)-1010(4), respectively. The first remote unit 1000 serves a first RF spectrum-based coverage area 1012. In a non-limiting example, the first remote unit 1000 transmits the first downlink sector communications signal 1008(3) in channel CH_X. The second remote unit 1002 is configured to distribute second downlink sector communications signals 1014(1)-1014(4) in second sectored coverage areas 1016(1)-1016(4), respectively. The second remote unit 1002 serves a second RF spectrum-based coverage area 1018. In a non-limiting example, the second remote unit 1002 transmits the second downlink sector communications signal 1014(4) in channel CH_Y. The third remote unit 1004 is configured to distribute third downlink sector communications signals 1020(1)-1020(4) in third sectored coverage areas 1022(1)-1022(4), respectively. The third remote unit 1004 serves a third RF spectrum-based coverage area 1024. In a non-limiting example, the third remote unit 1004 transmits the third downlink sector communications signal 1020(3) in channel CH_X as well. The first remote unit 1000 and the third remote 1004 are configured to provide RF coverage along a corridor 1025 through channel CH_X. As such, when the mobile user 1006 is moving from the first remote unit 1000 towards the third remote unit 1004, or vice versa, along the corridor 1025, the mobile user 1006 can remain on channel CH_X without requiring a handover.

However, the second remote 1002 may be transmitting the second downlink sector communications signal 1014(4) in channel CH_Y with excessive power. Consequently, the mobile user 1006 may also receive the second downlink sector communications signal 1014(4) in channel CH_Y in an overlapping coverage area 1026 (shown as a shaded area in FIG. 10A) when moving from the first remote unit 1000 towards the third remote unit 1004 along the corridor 1025. As a result, the mobile user 1006 may briefly handover from channel CH_X in the first RF spectrum-based coverage area 1012 to channel CH_Y in the second RF spectrum-based coverage area 1018, and then handover back from channel CH_Y in the second RF spectrum-based coverage area 1018 to channel CH_X in the third RF spectrum-based coverage area 1024. In this regard, the mobile user 1006 would experience two handovers when moving from the first remote unit 1000 towards the third remote unit 1004, or vice versa, along the corridor 1025. This additional handover can cause the mobile user 1006 to suffer unintended delay and/or power consumption, thus compromising performance experience for the mobile user 1006. Moreover, if channels CH_X and CH_Y are based on the same or adjacent RF frequency, the mobile user 1006 may suffer interference from the second downlink sector communications signal 1014(4) in channel CH_Y, even if the mobile user 1006 is stationary in the overlapping coverage area 1026.

In this regard, to improve the performance experience for the mobile user 1006, the second remote unit 1002 can be configured to reduce the power of the second downlink sector communications signal 1014(4). As a result, as shown in FIG. 10B, the second RF spectrum-based coverage area 1018 of FIG. 10A is reduced to a reduced second RF spectrum-based coverage area 1018'. Consequently, the overlapping coverage area 1026 of FIG. 10A is replaced by a new overlapping coverage area 1026' that is served by the first remote unit 1000 and the third remote unit 1004 in channel CH_X. As a result, the mobile user 1006 will not experience a handover when moving from the first remote unit 1000 towards the third remote unit 1004, or vice versa, along the corridor 1025, thus improving performance experience for the mobile user 1006.

Figure 11:
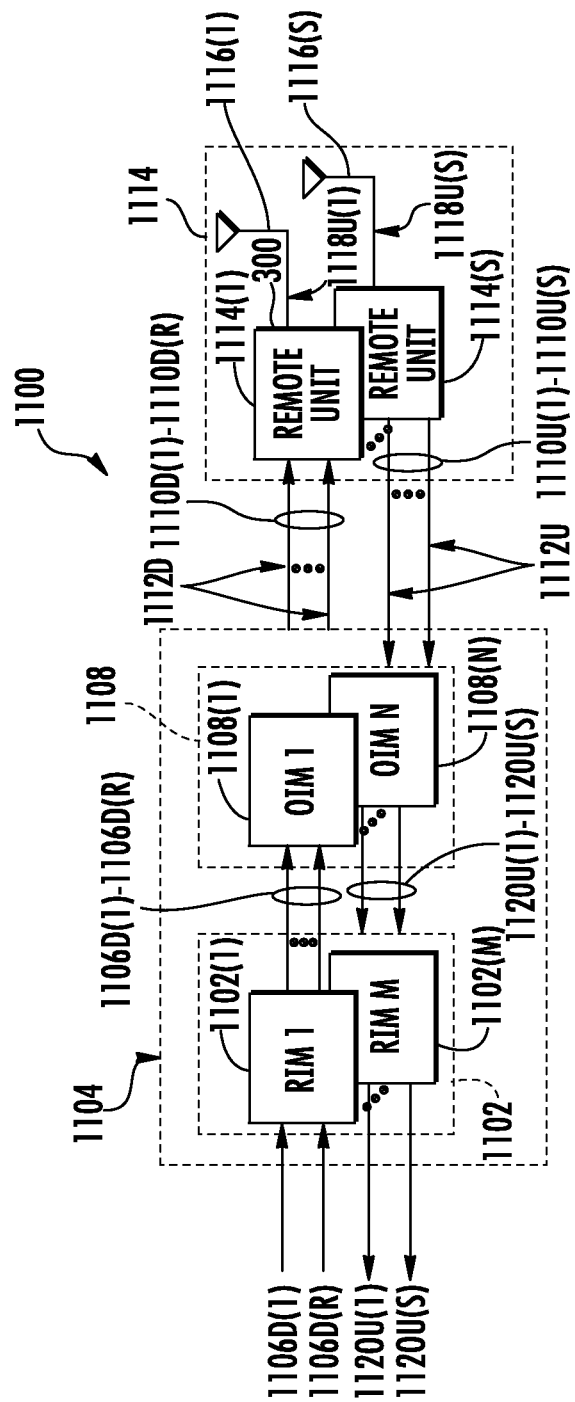
FIG. 11 is a schematic diagram an exemplary WDS provided in the form of an optical fiber-based WDS that can include a plurality of remote units, including the remote unit of FIG. 3, configured to support RF spectrum-based coverage area optimization.

FIG. 11 is a schematic diagram an exemplary WDS 1100 provided in the form of an optical fiber-based WDS that can include a plurality of remote units, including the remote unit 300 of FIG. 3, configured to support RF spectrum-based coverage area optimization. The WDS 1100 includes an optical fiber for distributing communications services for multiple frequency bands. The WDS 1100 in this example is comprised of three (3) main components. A plurality of radio interfaces provided in the form of radio interface modules (RIMs) 1102(1)-1102(M) are provided in a central unit 1104 to receive and process a plurality of downlink communications signals 1106D(1)-1106D(R) prior to optical conversion into downlink optical fiber-based communications signals. The downlink communications signals 1106D(1)-1106D(R) may be received from a base station as an example. The RIMs 1102(1)-1102(M) provide both downlink and uplink interfaces for signal processing. The notations "1-R" and "1-M" indicate that any number of the referenced component, 1-R and 1-M, respectively, may be provided. The central unit 1104 is configured to accept the RIMs 1102(1)-1102(M) as modular components that can easily be installed and removed or replaced in the central unit 1104. In one example, the central unit 1104 is configured to support up to twelve (12) RIMs 1102(1)-1102(12). Each RIM 1102(1)-1102(M) can be designed to support a particular type of radio source or range of radio sources (i.e., frequencies) to provide flexibility in configuring the central unit 1104 and the WDS 1100 to support the desired radio sources.

For example, one RIM 1102 may be configured to support the Personalized Communications System (PCS) radio band. Another RIM 1102 may be configured to support the 800 megahertz (MHz) radio band. In this example, by inclusion of the RIMs 1102(1)-1102(M), the central unit 1104 could be configured to support and distribute communications signals on both PCS and Long-Term Evolution (LTE) 700 radio bands, as an example. The RIMs 1102(1)-1102(M) may be provided in the central unit 1104 that support any frequency bands desired, including but not limited to the US Cellular band, PCS band, Advanced Wireless Service (AWS) band, 700 MHz band, Global System for Mobile communications (GSM) 900, GSM 1800, and Universal Mobile Telecommunications System (UMTS). The RIMs 1102(1)-1102(M) may also be provided in the central unit 1104 that support any wireless technologies desired, including but not limited to Code Division Multiple Access (CDMA), CDMA200, 1×RTT, Evolution-Data Only (EV-DO), UMTS, High-speed Packet Access (HSPA), GSM, General Packet Radio Services (GPRS), Enhanced Data GSM Environment (EDGE), Time Division Multiple Access (TDMA), LTE, iDEN, and Cellular Digital Packet Data (CDPD).

The RIMs 1102(1)-1102(M) may be provided in the central unit 1104 that support any frequencies desired, including but not limited to US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink).

With continuing reference to FIG. 11, the downlink communications signals 1106D(1)-1106D(R) are provided to a plurality of optical interfaces provided in the form of optical interface modules (OIMs) 1108(1)-1108(N) in this embodiment to convert the downlink communications signals 1106D(1)-1106D(R) into a plurality of downlink optical fiber-based communications signals 1110D(1)-1110D(R). The notation "1-N" indicates that any number of the referenced component 1-N may be provided. The OIMs 1108(1)-1108(N) may be configured to provide a plurality of optical interface components (OICs) that contain optical-to-electrical (O/E) and electrical-to-optical (E/O) converters, as will be described in more detail below. The OIMs 1108(1)-1108(N) support the radio bands that can be provided by the RIMs 1102(1)-1102(M), including the examples previously described above.

The OIMs 1108(1)-1108(N) each include E/O converters to convert the downlink communications signals 1106D(1)-1106D(R) into the downlink optical fiber-based communications signals 1110D(1)-1110D(R). The downlink optical fiber-based communications signals 1110D(1)-1110D(R) are communicated over a downlink optical fiber-based communications medium 1112D to a plurality of remote units 1114(1)-1114(S). At least one selected remote unit among the remote units 1114(1)-1114(S), for example the remote unit 1114(1), is provided as the remote unit 300 of FIG. 3 configured to support RF spectrum-based coverage area optimization. The notation "1-S" indicates that any number of the referenced component 1-S may be provided. Remote unit O/E converters provided in the remote units 1114(1)-1114(S) convert the downlink optical fiber-based communications signals 1110D(1)-1110D(R) back into the downlink communications signals 1106D(1)-1106D(R), which are the converted into a plurality of downlink RF communications signals and provided to antennas 1116(1)-1116(S) in the remote units 1114(1)-1114(S) to client devices in the reception range of the antennas 1116(1)-1116(S).

The remote units 1114(1)-1114(S) receive a plurality of uplink RF communications signals from the client devices through the antennas 1116(1)-1116(S). The remote units 1114(1)-1114(S) covert the uplink RF communications signals into a plurality of uplink communications signals 1118U(1)-1118U(S). Remote unit E/O converters are also provided in the remote units 1114(1)-1114(S) to convert the uplink communications signals 1118U(1)-1118U(S) into a plurality of uplink optical fiber-based communications signals 1110U(1)-1110U(S). The remote units 1114(1)-1114(S) communicate the uplink optical fiber-based communications signals 1110U(1)-1110U(S) over an uplink optical fiber-based communications medium 1112U to the OIMs 1108(1)-1108(N) in the central unit 1104. The OIMs 1108(1)-1108(N) include O/E converters that convert the received uplink optical fiber-based communications signals 1110U(1)-1110U(S) into uplink communications signals 1120U(1)-1120U(S), which are processed by the RIMs 1102(1)-1102(M) and provided as the uplink communications signals 1120U(1)-1120U(S). The central unit 1104 may provide the uplink communications signals 1120U(1)-1120U(S) to a base station or other communications system.

Note that the downlink optical fiber-based communications medium 1112D and the uplink optical fiber-based communications medium 1112U connected to each of the remote units 1114(1)-1114(S) may be a common optical fiber-based communications medium, wherein for example, wave division multiplexing (WDM) is employed to provide the downlink optical fiber-based communications signals 1110D(1)-1110D(R) and the uplink optical fiber-based communications signals 1110U(1)-1110U(S) on the same optical fiber-based communications medium.

Figure 12:
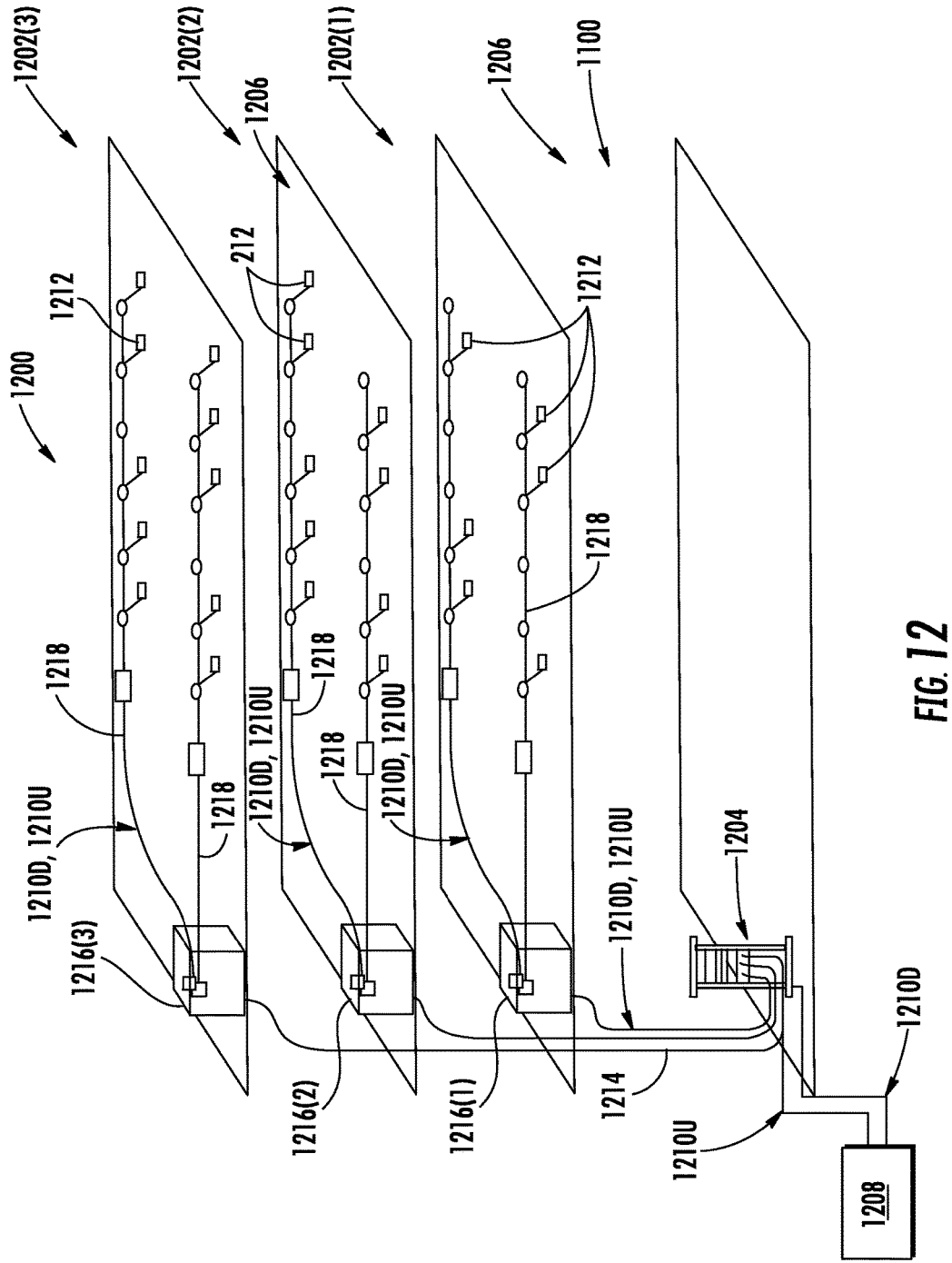
FIG. 12 is a partial schematic cut-away diagram of an exemplary building infrastructure in which a WDS, such as the WDS of FIG. 11, including the remote unit of FIG. 3, can be configured to support RF spectrum-based coverage area optimization.

The WDS 1100 of FIG. 11 may be provided in an indoor environment, as illustrated in FIG. 12. FIG. 12 is a partial schematic cut-away diagram of an exemplary building infrastructure 1200 in which a WDS, such as the WDS 1100 of FIG. 11, including the remote unit 300 of FIG. 3, can be configured to support RF spectrum-based coverage area optimization. The building infrastructure 1200 in this embodiment includes a first (ground) floor 1202(1), a second floor 1202(2), and a third floor 1202(3). The floors 1202(1)-1202(3) are serviced by a central unit 1204 to provide antenna coverage areas 1206 in the building infrastructure 1200. The central unit 1204 is communicatively coupled to a base station 1208 to receive downlink communications signals 1210D from the base station 1208. The central unit 1204 is communicatively coupled to a plurality of remote units 1212 to distribute the downlink communications signals 1210D to the remote units 1212 and to receive uplink communications signals 1210U from the remote units 1212, as previously discussed above. The downlink communications signals 1210D and the uplink communications signals 1210U communicated between the central unit 1204 and the remote units 1212 are carried over a riser cable 1214. The riser cable 1214 may be routed through interconnect units (ICUs) 1216(1)-1216(3) dedicated to each of the floors 1202(1)-1202(3) that route the downlink communications signals 1210D and the uplink communications signals 1210U to the remote units 1212 and also provide power to the remote units 1212 via array cables 1218.

Figure 13:
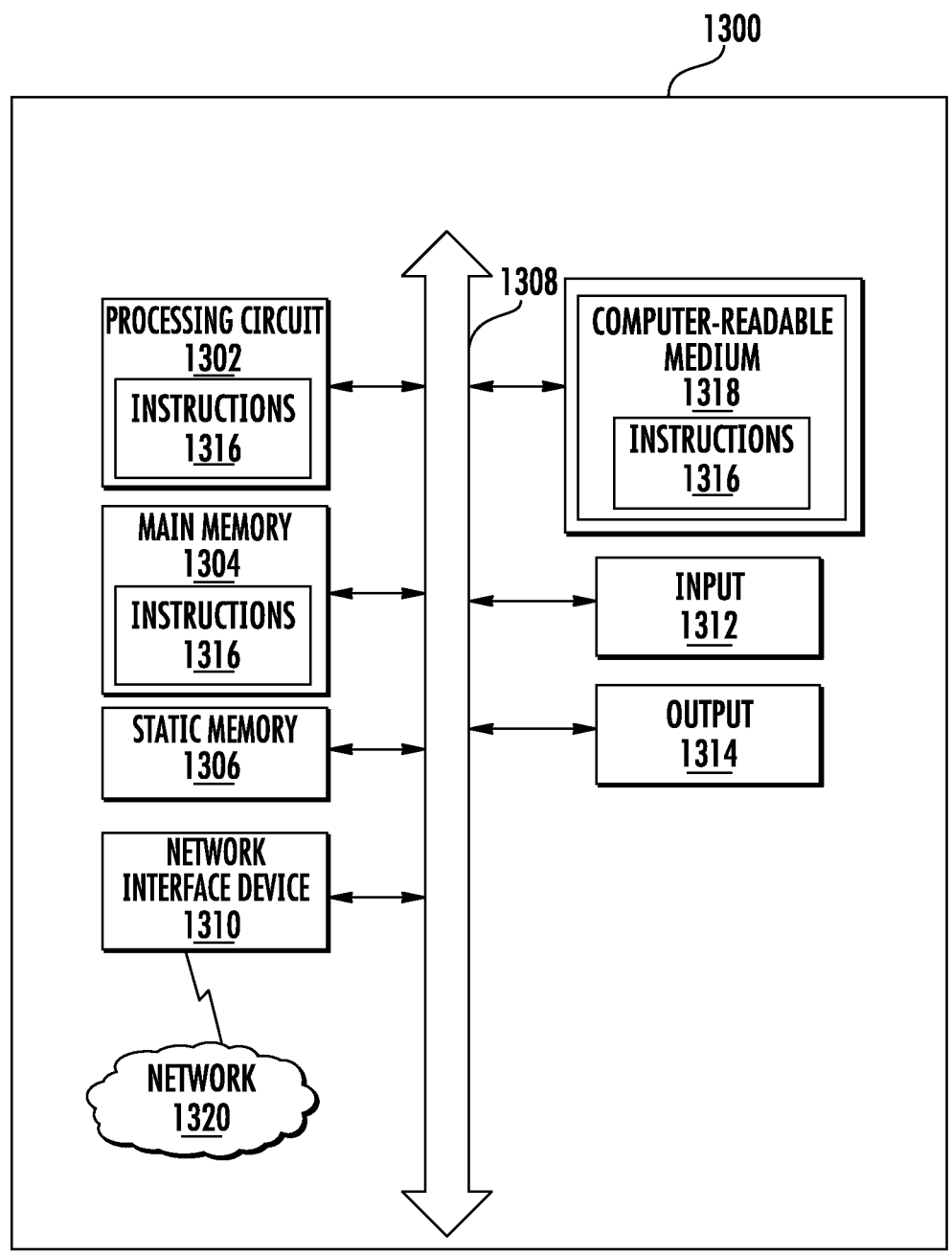
FIG. 13 is a schematic diagram representation of additional detail illustrating an exemplary computer system that could be employed in a controller, including a processing circuit in the remote unit of FIG. 3, for supporting RF spectrum-based coverage area optimization.

FIG. 13 is a schematic diagram representation of additional detail illustrating an exemplary computer system 1300 that could be employed in a controller, including the processing circuit 314 in the remote unit 300 of FIG. 3, for supporting RF spectrum-based coverage area optimization. In this regard, the computer system 1300 is adapted to execute instructions from an exemplary computer-readable medium to perform these and/or any of the functions or processing described herein.

In this regard, the computer system 1300 in FIG. 13 may include a set of instructions that may be executed to predict frequency interference to avoid or reduce interference in a multi-frequency DAS. The computer system 1300 may be connected (e.g., networked) to other machines in a LAN, an intranet, an extranet, or the Internet. While only a single device is illustrated, the term "device" shall also be taken to include any collection of devices that individually or jointly execute a set (or multiple sets) of instructions to perform any one or more of the methodologies discussed herein. The computer system 1300 may be a circuit or circuits included in an electronic board card, such as, a printed circuit board (PCB), a server, a personal computer, a desktop computer, a laptop computer, a personal digital assistant (PDA), a computing pad, a mobile device, or any other device, and may represent, for example, a server or a user's computer.

The exemplary computer system 1300 in this embodiment includes a processing circuit 1302, a main memory 1304 (e.g., read-only memory (ROM), flash memory, dynamic random access memory (DRAM), such as synchronous DRAM (SDRAM), etc.), and a static memory 1306 (e.g., flash memory, static random access memory (SRAM), etc.), which may communicate with each other via a data bus 1308. Alternatively, the processing circuit 1302 may be connected to the main memory 1304 and/or the static memory 1306 directly or via some other connectivity means. The processing circuit 1302 may be a controller, and the main memory 1304 or the static memory 1306 may be any type of memory.

The processing circuit 1302 represents one or more general-purpose processing devices, such as a microprocessor, central processing unit, or the like. More particularly, the processing circuit 1302 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processing circuit 1302 is configured to execute processing logic in instructions for performing the operations and steps discussed herein.

The computer system 1300 may further include a network interface device 1310. The computer system 1300 also may or may not include an input 1312, configured to receive input and selections to be communicated to the computer system 1300 when executing instructions. The computer system 1300 also may or may not include an output 1314, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 1300 may or may not include a data storage device that includes instructions 1316 stored in a computer-readable medium 1318. The instructions 1316 may also reside, completely or at least partially, within the main memory 1304 and/or within the processing circuit 1302 during execution thereof by the computer system 1300, the main memory 1304 and the processing circuit 1302 also constituting computer-readable medium. The instructions 1316 may further be transmitted or received over a network 1320 via the network interface device 1310.

While the computer-readable medium 1318 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); and the like.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A remote unit in a wireless distribution system (WDS), comprising:
 a plurality of sector radio frequency (RF) paths each comprising an antenna configured to distribute a respective downlink sector communications signal; and
 a processing circuit configured to:
  receive at least one downlink communications stream corresponding to at least one downlink spectrum chunk comprising a plurality of downlink spectrums;
  generate a plurality of downlink sector communications signals corresponding to a plurality of downlink RF spectrum chunks, respectively, based on the at least one downlink communications stream, wherein each of the plurality of downlink RF spectrum chunks comprises one or more downlink RF spectrums generated from one or more of the plurality of downlink spectrums in the at least one downlink spectrum chunk;
  determine a selected downlink sector communications signal among the plurality of downlink sector communications signals to be transmitted at a selected power from a selected sector RF path among the plurality of sector RF paths in a selected downlink RF spectrum among the one or more downlink RF spectrums in a selected downlink RF spectrum chunk among the plurality of downlink RF spectrum chunks;

cause the selected downlink sector communications signal to be adjusted to the selected power; and provide the selected downlink sector communications signal to the selected sector RF path.

2. The remote unit of claim 1, wherein the processing circuit is further configured to:

determine a first selected downlink sector communications signal among the plurality of downlink sector communications signals to be transmitted at a first selected power from a first selected sector RF path among the plurality of sector RF paths in a first selected downlink RF spectrum;

determine a second selected downlink sector communications signal among the plurality of downlink sector communications signals to be transmitted at a second selected power from a second selected sector RF path among the plurality of sector RF paths in a second selected downlink RF spectrum;

provide the first selected downlink sector communications signal to the first selected sector RF path; and provide the second selected downlink sector communications signal to the second selected sector RF path.

3. The remote unit of claim 1, further comprising a data stream constructor-deconstructor circuit configured to:

receive a downlink communications signal from a central unit in the WDS;

deconstruct the downlink communications signal to generate the at least one downlink communications stream corresponding to the at least one downlink spectrum chunk; and provide the at least one downlink communications stream to the processing circuit.

4. The remote unit of claim 3, wherein the data stream constructor-deconstructor circuit is further configured to:

receive a downlink digital communications signal from the central unit in the WDS;

deconstruct the downlink digital communications signal to generate at least one downlink digital communications stream corresponding to at least one downlink digital spectrum chunk; and provide the at least one downlink digital communications stream to the processing circuit.

5. The remote unit of claim 4, wherein the data stream constructor-deconstructor circuit is configured to receive the downlink digital communications signal based on a common public radio interface (CPRI) protocol.

6. The remote unit of claim 4, wherein the processing circuit is configured to:

receive the at least one downlink digital communications stream from the data stream constructor-deconstructor circuit;

generate a plurality of downlink digital sector communications signals based on the at least one downlink digital communications stream; and convert the plurality of downlink digital sector communications signals into the plurality of downlink sector communications signals.

7. The remote unit of claim 6, wherein the processing circuit comprises a plurality of digital-to-analog converters (DACs) configured to convert the plurality of downlink digital sector communications signals into the plurality of downlink sector communications signals.

8. The remote unit of claim 6, wherein the processing circuit is further configured to:

determine at least one selected downlink digital sector communications signal among the plurality of downlink digital sector communications signals having a respective downlink digital spectrum corresponding to the selected downlink RF spectrum of the selected downlink sector communications signal; and perform digital power conditioning on the at least one selected downlink digital sector communications signal.

9. The remote unit of claim 8, wherein the processing circuit is configured to perform the digital power conditioning on the at least one selected downlink digital sector communications signal by adjusting magnitude of the at least one selected downlink digital sector communications signal.

10. The remote unit of claim 8, wherein the processing circuit is configured to perform the digital power conditioning on the at least one selected downlink digital sector communications signal by adjusting phase of the at least one selected downlink digital sector communications signal.

11. The remote unit of claim 8, wherein the processing circuit is configured to perform the digital power conditioning on the at least one selected downlink digital sector communications signal by adjusting equalization of the at least one selected downlink digital sector communications signal.

12. The remote unit of claim 8, wherein the selected sector RF path comprises a power amplifier-attenuator circuit coupled to the antenna in the selected sector RF path.

13. The remote unit of claim 12, wherein the power amplifier-attenuator circuit is configured to amplify the selected downlink sector communications signal to the selected power to extend downlink RF coverage in the selected downlink RF spectrum.

14. The remote unit of claim 12, wherein the power amplifier-attenuator circuit is configured to attenuate the selected downlink sector communications signal to the selected power to reduce downlink RF coverage in the selected downlink RF spectrum.

15. The remote unit of claim 3, wherein the selected sector RF path comprises a plurality of power amplifier-attenuator circuits coupled to the antenna in the selected sector RF path.

16. The remote unit of claim 15, wherein the processing circuit is further configured to:

determine a selected power amplifier-attenuator circuit among the plurality of power amplifier-attenuator circuits to amplify the selected downlink sector communications signal to extend downlink RF coverage in the selected downlink RF spectrum; and provide the selected downlink sector communications signal to the selected power amplifier-attenuator circuit.

17. The remote unit of claim 15, wherein the processing circuit is further configured to:

determine a selected power amplifier-attenuator circuit among the plurality of power amplifier-attenuator circuits to attenuate the selected downlink sector communications signal to reduce downlink RF coverage in the selected downlink RF spectrum; and provide the selected downlink sector communications signal to the selected power amplifier-attenuator circuit.

18. The remote unit of claim 3, wherein:

the plurality of sector RF paths is further configured to receive a plurality of uplink sector communications signals corresponding to a plurality of uplink RF spectrum chunks, wherein each of the plurality of uplink RF spectrum chunks comprises one or more uplink RF spectrums;

the processing circuit is further configured to generate at least one uplink communications stream based on the plurality of uplink sector communications signals, wherein the at least one uplink communications stream corresponds to at least one uplink spectrum chunk comprising a plurality of uplink spectrums generated based on the plurality of uplink RF spectrum chunks; and the data stream constructor-deconstructor circuit is further configured to:
receive the at least one uplink communications stream from the processing circuit;
construct an uplink communications signal based on the at least one uplink communications stream; and
provide the uplink communications signal to the central unit in the WDS.

19. The remote unit of claim 18, wherein:
the processing circuit is further configured to:
receive the plurality of uplink sector communications signals;
convert the plurality of uplink sector communications signals into a plurality of uplink digital sector communications signals, respectively;
generate at least one uplink digital communications stream corresponding to at least one uplink digital spectrum chunk based on the plurality of uplink digital sector communications signals; and
provide the at least one uplink digital communications stream to the data stream constructor-deconstructor circuit; and
the data stream constructor-deconstructor circuit is further configured to:
construct an uplink digital communications signal based on the at least one uplink digital communications stream; and
provide the uplink digital communications signal to the central unit in the WDS.

20. The remote unit of claim 19, wherein the processing circuit comprises a plurality of analog-to-digital converters (ADCs) configured to convert the plurality of uplink sector communications signals into the plurality of uplink digital sector communications signals.

21. The remote unit of claim 18, wherein the processing circuit is further configured to increase receive-sensitivity of a second selected sector RF path among the plurality of sector RF paths to extend uplink RF coverage in a selected uplink RF spectrum among the plurality of uplink RF spectrum chunks.

22. The remote unit of claim 18, wherein the processing circuit is further configured to decrease receive-sensitivity of a second selected sector RF path among the plurality of sector RF paths to reduce uplink RF coverage in a selected uplink RF spectrum among the plurality of uplink RF spectrum chunks.

23. A method for supporting radio frequency (RF) spectrum-based coverage area optimization in a remote unit in a wireless distribution system (WDS), comprising:
receiving at least one downlink communications stream corresponding to at least one downlink spectrum chunk comprising a plurality of downlink spectrums;
generating a plurality of downlink sector communications signals corresponding to a plurality of downlink RF spectrum chunks, respectively, based on the at least one downlink communications stream, wherein each of the plurality of downlink RF spectrum chunks comprises one or more downlink RF spectrums generated from one or more of the plurality of downlink spectrums in the at least one downlink spectrum chunk;
determining a selected downlink sector communications signal among the plurality of downlink sector communications signals to be transmitted at a selected power from a selected sector RF path among a plurality of sector RF paths in a selected downlink RF spectrum among the one or more downlink RF spectrums in a selected downlink RF spectrum chunk among the plurality of downlink RF spectrum chunks;
causing the selected downlink sector communications signal to be adjusted to the selected power; and
providing the selected downlink sector communications signal to the selected sector RF path.

24. The method of claim 23, further comprising:
determining a first selected downlink sector communications signal among the plurality of downlink sector communications signals to be transmitted at a first selected power from a first selected sector RF path among the plurality of sector RF paths in a first selected downlink RF spectrum;
determining a second selected downlink sector communications signal among the plurality of downlink sector communications signals to be transmitted at a second selected power from a second selected sector RF path among the plurality of sector RF paths in a second selected downlink RF spectrum;
providing the first selected downlink sector communications signal to the first selected sector RF path; and
providing the second selected downlink sector communications signal to the second selected sector RF path.

25. The method of claim 23, further comprising:
receiving a downlink communications signal from a central unit in the WDS; and
deconstructing the downlink communications signal to generate the at least one downlink communications stream corresponding to the at least one downlink spectrum chunk.

26. The method of claim 25, further comprising:
receiving a downlink digital communications signal from the central unit in the WDS; and
deconstructing the downlink digital communications signal to generate at least one downlink digital communications stream corresponding to at least one downlink digital spectrum chunk.

27. The method of claim 26, further comprising receiving the downlink digital communications signal based on a common public radio interface (CPRI) protocol.

28. The method of claim 26, further comprising:
generating a plurality of downlink digital sector communications signals based on the at least one downlink digital communications stream; and
converting the plurality of downlink digital sector communications signals into the plurality of downlink sector communications signals.

29. The method of claim 28, further comprising:
determining at least one selected downlink digital sector communications signal among the plurality of downlink digital sector communications signals having a respective downlink digital spectrum corresponding to the selected downlink RF spectrum of the selected downlink sector communications signal; and
performing digital power conditioning on the at least one selected downlink digital sector communications signal.

30. The method of claim 29, further comprising performing the digital power conditioning on the at least one selected downlink digital sector communications signal by adjusting magnitude of the at least one selected downlink digital sector communications signal.

31. The method of claim 29, further comprising performing the digital power conditioning on the at least one selected downlink digital sector communications signal by adjusting phase of the at least one selected downlink digital sector communications signal.

32. The method of claim 29, further comprising performing the digital power conditioning on the at least one selected downlink digital sector communications signal by adjusting equalization of the at least one selected downlink digital sector communications signal.

33. The method of claim 29, further comprising amplifying the selected downlink sector communications signal to the selected power to extend downlink RF coverage in the selected downlink RF spectrum.

34. The method of claim 29, further comprising attenuating the selected downlink sector communications signal to the selected power to reduce downlink RF coverage in the selected downlink RF spectrum.

35. The method of claim 25, further comprising:
determining a selected power amplifier-attenuator circuit among a plurality of power amplifier-attenuator circuits in the selected sector RF path to amplify the selected downlink sector communications signal to extend downlink RF coverage in the selected downlink RF spectrum; and
providing the selected downlink sector communications signal to the selected power amplifier-attenuator circuit.

36. The method of claim 25, further comprising:
determining a selected power amplifier-attenuator circuit among a plurality of power amplifier-attenuator circuits to attenuate the selected downlink sector communications signal to reduce downlink RF coverage in the selected downlink RF spectrum; and
providing the selected downlink sector communications signal to the selected power amplifier-attenuator circuit.

37. The method of claim 25, further comprising:
receiving a plurality of uplink sector communications signals corresponding to a plurality of uplink RF spectrum chunks, wherein each of the plurality of uplink RF spectrum chunks comprises one or more uplink RF spectrums;
generating at least one uplink communications stream based on the plurality of uplink sector communications signals, wherein the at least one uplink communications stream corresponds to at least one uplink spectrum chunk comprising a plurality of uplink spectrums generated based on the plurality of uplink RF spectrum chunks;
constructing an uplink communications signal based on the at least one uplink communications stream; and
providing the uplink communications signal to the central unit in the WDS.

38. The method of claim 37, further comprising:
converting the plurality of uplink sector communications signals into a plurality of uplink digital sector communications signals, respectively;
generating at least one uplink digital communications stream corresponding to at least one uplink digital spectrum chunk based on the plurality of uplink digital sector communications signals;
constructing an uplink digital communications signal based on the at least one uplink digital communications stream; and
providing the uplink digital communications signal to the central unit in the WDS.

39. The method of claim 37, further comprising increasing receive-sensitivity of a second selected sector RF path among the plurality of sector RF paths to extend uplink RF coverage in a selected uplink RF spectrum among the plurality of uplink RF spectrum chunks.

40. The method of claim 37, further comprising decreasing receive-sensitivity of a second selected sector RF path among the plurality of sector RF paths to reduce uplink RF coverage in a selected uplink RF spectrum among the plurality of uplink RF spectrum chunks.

41. A wireless distribution system (WDS), comprising:
a plurality of remote units configured to:
receive and convert a plurality of downlink communications signals into a plurality of downlink radio frequency (RF) communications signals for distribution to client devices;
receive a plurality of uplink RF communications signals from the client devices and convert the plurality of uplink RF communications signals into a plurality of uplink communications signals; and
a central unit configured to:
distribute the plurality of downlink communications signals to the plurality of remote units over a downlink communications medium; and
receive the plurality of uplink communications signals from the plurality of remote units over an uplink communications medium;
wherein at least one selected remote unit among the plurality of remote units comprises:
a plurality of sector RF paths each comprising an antenna configured to distribute a respective downlink sector communications signal;
a data stream constructor-deconstructor circuit configured to:
receive a downlink communications signal among the plurality of downlink communications signals; and
deconstruct the downlink communications signal to generate at least one downlink communications stream corresponding to at least one downlink spectrum chunk comprising a plurality of downlink spectrums; and
a processing circuit configured to:
receive the at least one downlink communications stream from the data stream constructor-deconstructor circuit;
generate a plurality of downlink sector communications signals corresponding to a plurality of downlink RF spectrum chunks, respectively, based on the at least one downlink communications stream, wherein each of the plurality of downlink RF spectrum chunks comprises one or more downlink RF spectrums generated from one or more of the plurality of downlink spectrums in the at least one downlink spectrum chunk;
determine a selected downlink sector communications signal among the plurality of downlink sector communications signals to be transmitted at a selected power from a selected sector RF path among the plurality of sector RF paths in a selected downlink RF spectrum among the one or more downlink RF spectrums in a selected downlink RF spectrum chunk among the plurality of downlink RF spectrum chunks; and
cause the selected downlink sector communications signal to be adjusted to the selected power; and
provide the selected downlink sector communications signal to the selected sector RF path.

42. The WDS of claim 41, wherein the processing circuit in the at least one selected remote unit is further configured to:
determine a first selected downlink sector communications signal among the plurality of downlink sector communications signals to be transmitted at a first selected power from a first selected sector RF path among the plurality of sector RF paths in a first selected downlink RF spectrum;
determine a second selected downlink sector communications signal among the plurality of downlink sector communications signals to be transmitted at a second selected power from a second selected sector RF path among the plurality of sector RF paths in a second selected downlink RF spectrum;
provide the first selected downlink sector communications signal to the first selected sector RF path; and
provide the second selected downlink sector communications signal to the second selected sector RF path.

43. The WDS of claim 41, wherein the data stream constructor-deconstructor circuit in the at least one selected remote unit is further configured to:
receive a downlink digital communications signal from the central unit in the WDS;
deconstruct the downlink digital communications signal to generate at least one downlink digital communications stream corresponding to at least one downlink digital spectrum chunk; and
provide the at least one downlink digital communications stream to the processing circuit.

44. The WDS of claim 43, wherein the data stream constructor-deconstructor circuit in the at least one selected remote unit is configured to receive the downlink digital communications signal based on a common public radio interface (CPRI) protocol.

45. The WDS of claim 43, wherein the processing circuit in the at least one selected remote unit is configured to:
receive the at least one downlink digital communications stream from the data stream constructor-deconstructor circuit;
generate a plurality of downlink digital sector communications signals based on the at least one downlink digital communications stream; and
convert the plurality of downlink digital sector communications signals into the plurality of downlink sector communications signals.

46. The WDS of claim 45, wherein the processing circuit in the at least one selected remote unit comprises a plurality of digital-to-analog converters (DACs) configured to convert the plurality of downlink digital sector communications signals into the plurality of downlink sector communications signals.

47. The WDS of claim 45, wherein the processing circuit in the at least one selected remote unit is further configured to:
determine at least one selected downlink digital sector communications signal among the plurality of downlink digital sector communications signals having a respective downlink digital spectrum corresponding to the selected downlink RF spectrum of the selected downlink sector communications signal; and
perform digital power conditioning on the at least one selected downlink digital sector communications signal.

48. The WDS of claim 47, wherein the processing circuit in the at least one selected remote unit is configured to perform the digital power conditioning on the at least one selected downlink digital sector communications signal by adjusting magnitude of the at least one selected downlink digital sector communications signal.

49. The WDS of claim 47, wherein the processing circuit in the at least one selected remote unit is configured to perform the digital power conditioning on the at least one selected downlink digital sector communications signal by adjusting phase of the at least one selected downlink digital sector communications signal.

50. The WDS of claim 47, wherein the processing circuit in the at least one selected remote unit is configured to perform the digital power conditioning on the at least one selected downlink digital sector communications signal by adjusting equalization of the at least one selected downlink digital sector communications signal.

51. The WDS of claim 47, wherein the selected sector RF path in the at least one selected remote unit comprises a power amplifier-attenuator circuit coupled to the antenna in the selected sector RF path.

52. The WDS of claim 51, wherein the power amplifier-attenuator circuit in the at least one selected remote unit is configured to amplify the selected downlink sector communications signal to the selected power to extend downlink RF coverage in the selected downlink RF spectrum.

53. The WDS of claim 51, wherein the power amplifier-attenuator circuit in the at least one selected remote unit is configured to attenuate the selected downlink sector communications signal to the selected power to reduce downlink RF coverage in the selected downlink RF spectrum.

54. The WDS of claim 41, wherein the selected sector RF path in the at least one selected remote unit comprises a plurality of power amplifier-attenuator circuits coupled to the antenna in the selected sector RF path.

55. The WDS of claim 54, wherein the processing circuit in the at least one selected remote unit is further configured to:
determine a selected power amplifier-attenuator circuit among the plurality of power amplifier-attenuator circuits to amplify the selected downlink sector communications signal to extend downlink RF coverage in the selected downlink RF spectrum; and
provide the selected downlink sector communications signal to the selected power amplifier-attenuator circuit.

56. The WDS of claim 54, wherein the processing circuit in the at least one selected remote unit is further configured to:
determine a selected power amplifier-attenuator circuit among the plurality of power amplifier-attenuator circuits to attenuate the selected downlink sector communications signal to reduce downlink RF coverage in the selected downlink RF spectrum; and
provide the selected downlink sector communications signal to the selected power amplifier-attenuator circuit.

57. The WDS of claim 41, wherein:
the plurality of sector RF paths in the at least one selected remote unit is further configured to receive a plurality of uplink sector communications signals corresponding to a plurality of uplink RF spectrum chunks, wherein each of the plurality of uplink RF spectrum chunks comprises one or more uplink RF spectrums;

the processing circuit in the at least one selected remote unit is further configured to generate at least one uplink communications stream based on the plurality of uplink sector communications signals, wherein the at least one uplink communications stream corresponds to at least one uplink spectrum chunk comprising a plurality of uplink spectrums generated based on the plurality of uplink RF spectrum chunks; and the data stream constructor-deconstructor circuit in the at least one selected remote unit is further configured to:
  receive the at least one uplink communications stream from the processing circuit;
  construct an uplink communications signal based on the at least one uplink communications stream; and
  provide the uplink communications signal among the plurality of uplink communications signals to the central unit in the WDS.

58. The WDS of claim 57, wherein:

the processing circuit in the at least one selected remote unit is further configured to:
  receive the plurality of uplink sector communications signals;
  convert the plurality of uplink sector communications signals into a plurality of uplink digital sector communications signals, respectively;
  generate at least one uplink digital communications stream corresponding to at least one uplink digital spectrum chunk based on the plurality of uplink digital sector communications signals; and
  provide the at least one uplink digital communications stream to the data stream constructor-deconstructor circuit; and the data stream constructor-deconstructor circuit in the at least one selected remote unit is further configured to:
  construct an uplink digital communications signal among the plurality of uplink communications signals based on the at least one uplink digital communications stream; and
  provide the uplink digital communications signal to the central unit in the WDS.

59. The WDS of claim 58, wherein the processing circuit in the at least one selected remote unit comprises a plurality of analog-to-digital converters (ADCs) configured to convert the plurality of uplink sector communications signals into the plurality of uplink digital sector communications signals.

60. The WDS of claim 57, wherein the processing circuit in the at least one selected remote unit is further configured to increase receive-sensitivity of a second selected sector RF path among the plurality of sector RF paths to extend uplink RF coverage in a selected uplink RF spectrum among the plurality of uplink RF spectrum chunks.

61. The WDS of claim 57, wherein the processing circuit in the at least one selected remote unit is further configured to decrease receive-sensitivity of a second selected sector RF path among the plurality of sector RF paths to reduce uplink RF coverage in a selected uplink RF spectrum among the plurality of uplink RF spectrum chunks.

62. The WDS of claim 41, wherein:

the central unit comprises electrical-to-optical (E/O) converters configured to convert the plurality of downlink communications signals into a plurality of downlink optical fiber-based communications signals for distribution to the plurality of remote units over a downlink optical fiber-based communications medium;

the plurality of remote units comprises:
  remote unit optical-to-electrical (O/E) converters configured to convert the plurality of downlink optical fiber-based communications signals into the plurality of downlink communications signals; and
  remote unit E/O converters configured to convert the plurality of uplink communications signals into a plurality of uplink optical fiber-based communications signals; and the central unit further comprises O/E converters configured to convert the plurality of uplink optical fiber-based communications signals received from the plurality of remote units over an uplink optical fiber-based communications medium into the plurality of uplink communications signals.

* * * * *

UNITED STATES PATENT AND TRADEMARK OFFICE
CERTIFICATE OF CORRECTION

PATENT NO. : 10,291,298 B2  
APPLICATION NO. : 15/490049  
DATED : May 14, 2019  
INVENTOR(S) : Dror Harel Page 1 of 1

It is certified that error appears in the above-identified patent and that said Letters Patent is hereby corrected as shown below:

In the Claims

In Column 27, Line 2, Claim 41, after "chunks;" delete "and".

Signed and Sealed this  
Seventeenth Day of March, 2020

Andrei Iancu  
*Director of the United States Patent and Trademark Office*